US012645121B2

(12) United States Patent     (10) Patent No.:   US 12,645,121 B2

Zhu et al.          (45) Date of Patent:      Jun. 2, 2026

(54) ARRAY SUBSTRATE AND PREPARATION METHOD THEREFOR, AND DISPLAY PANEL

(71) Applicants:Wuhan BOE Optoelectronics Technology Co., Ltd., Hubei (CN); BOE Technology Group Co., Ltd., Beijing (CN)

(72) Inventors: Ning Zhu, Beijing (CN); Yun Li, Beijing (CN); Yan Zhou, Beijing (CN); Chao Wang, Beijing (CN); Xiaoxiao Chen, Beijing (CN)

(73) Assignees: Wuhan BOE Optoelectronics Technology Co., Ltd., Wuhan (CN); BOE Technology Group Co., Ltd., Beijing (CN)

( * ) Notice: Subject to any disclaimer, the term of this patent is extended or adjusted under 35 U.S.C. 154(b) by 165 days.

(21) Appl. No.: 18/727,197

(22) PCT Filed: Mar. 29, 2023

(86) PCT No.: PCT/CN2023/084774

§ 371 (c)(1),
(2) Date: Jul. 8, 2024

(87) PCT Pub. No.: WO2024/197650

PCT Pub. Date: Oct. 3, 2024

(65) Prior Publication Data

US 2026/0029680 A1     Jan. 29, 2026

(51) Int. Cl.
*G02F 1/1362*      (2006.01)

(52) U.S. Cl.
CPC .... *G02F 1/136295* (2021.01); *G02F 1/13624* (2013.01)

(58) Field of Classification Search
CPC ........... G02F 1/136295; G02F 1/13624; G02F 1/136245; G02F 1/136213; G02F 1/136218; G02F 1/1362
See application file for complete search history.

(56) References Cited

U.S. PATENT DOCUMENTS

| | | | | |
|---|---|---|---|---|
| 11,841,596 | B2 * | 12/2023 | Yang | ................. G02F 1/136286 |
| 2005/0127359 | A1 | 6/2005 | Son | |
| 2024/0419043 | A1 * | 12/2024 | Chang | ............... G02F 1/136218 |

FOREIGN PATENT DOCUMENTS

| | | |
|---|---|---|
| CN | 105159001 A | 12/2015 |
| CN | 105974690 A | 9/2016 |

(Continued)

*Primary Examiner* — David Y Chung

(74) *Attorney, Agent, or Firm* — Workman Nydegger

(57) ABSTRACT

The present disclosure provides an array substrate and a preparation method therefor, and a display panel. The array substrate includes a plurality of pixel pairs distributed in an array, where two gate lines are provided between two adjacent rows of pixel pairs, and each the pixel pair includes a first pixel electrode and a second pixel electrode arranged side by side and connected to the same data line, a first pixel switch and a second pixel switch electrically connected with the first pixel electrode and the second pixel electrode, respectively, in an extension direction of the data line, the first pixel switch and the second pixel switch being distributed in pairs between two different pixel pairs, respectively, and a first pixel switch and a second pixel switch corresponding to a pixel pair being located at both sides of the pixel pair, and a first conductive structure.

20 Claims, 15 Drawing Sheets

(56)          References Cited

FOREIGN PATENT DOCUMENTS

| | | | |
|---|---|---|---|
| CN | 110488548 | A | 11/2019 |
| CN | 113376912 | A | 9/2021 |
| CN | 113608386 | A | 11/2021 |
| CN | 113692553 | A | 11/2021 |
| CN | 215526310 | U | 1/2022 |
| CN | 115373186 | A | 11/2022 |

* cited by examiner

GB common gate                    RG common gate

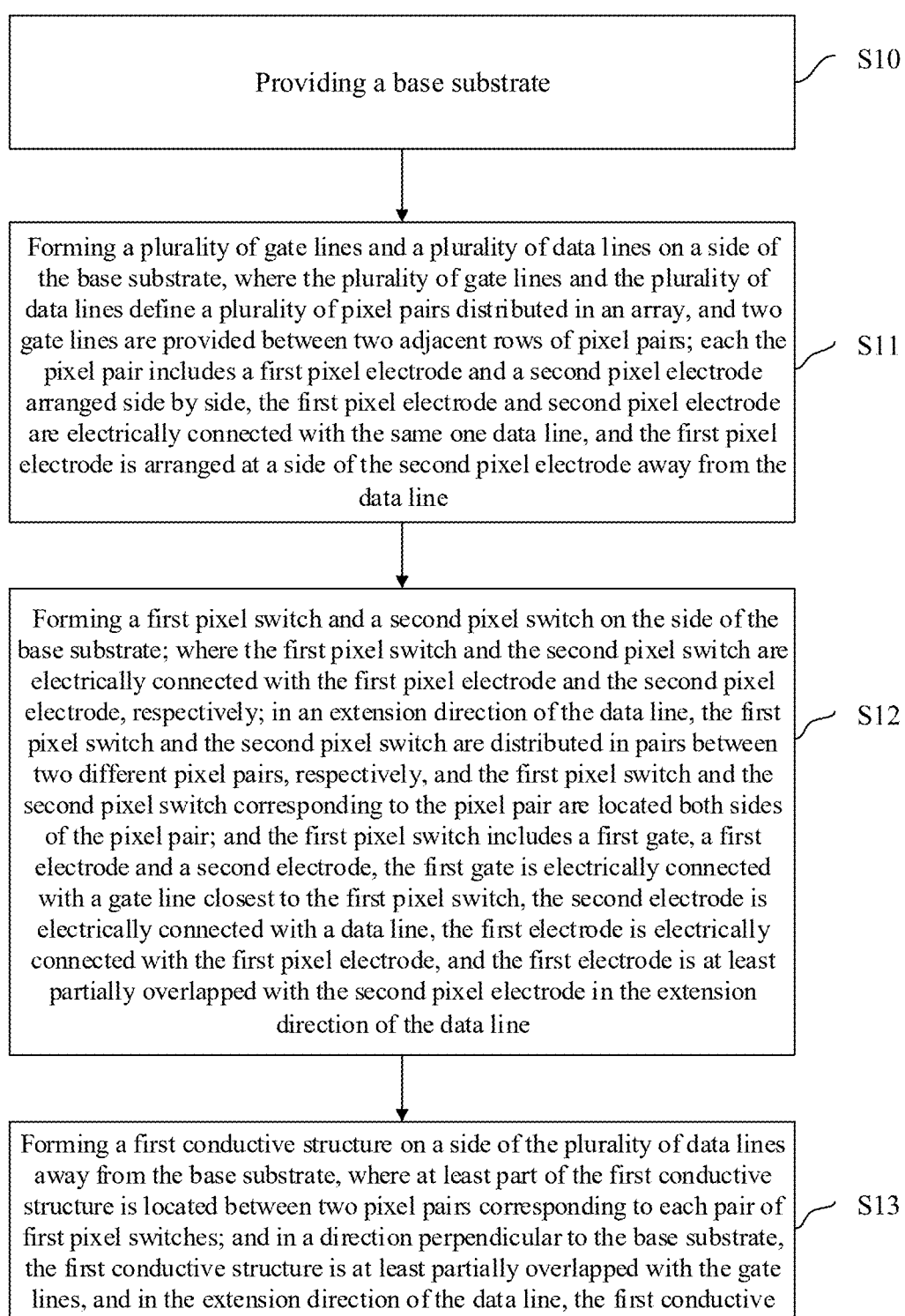

Providing a base substrate — S10

Forming a plurality of gate lines and a plurality of data lines on a side of the base substrate, where the plurality of gate lines and the plurality of data lines define a plurality of pixel pairs distributed in an array, and two gate lines are provided between two adjacent rows of pixel pairs; each the pixel pair includes a first pixel electrode and a second pixel electrode arranged side by side, the first pixel electrode and second pixel electrode are electrically connected with the same one data line, and the first pixel electrode is arranged at a side of the second pixel electrode away from the data line — S11

Forming a first pixel switch and a second pixel switch on the side of the base substrate; where the first pixel switch and the second pixel switch are electrically connected with the first pixel electrode and the second pixel electrode, respectively; in an extension direction of the data line, the first pixel switch and the second pixel switch are distributed in pairs between two different pixel pairs, respectively, and the first pixel switch and the second pixel switch corresponding to the pixel pair are located both sides of the pixel pair; and the first pixel switch includes a first gate, a first electrode and a second electrode, the first gate is electrically connected with a gate line closest to the first pixel switch, the second electrode is electrically connected with a data line, the first electrode is electrically connected with the first pixel electrode, and the first electrode is at least partially overlapped with the second pixel electrode in the extension direction of the data line — S12

Forming a first conductive structure on a side of the plurality of data lines away from the base substrate, where at least part of the first conductive structure is located between two pixel pairs corresponding to each pair of first pixel switches; and in a direction perpendicular to the base substrate, the first conductive structure is at least partially overlapped with the gate lines, and in the extension direction of the data line, the first conductive structure is at least partially overlapped with the first electrode — S13

FIG. 22

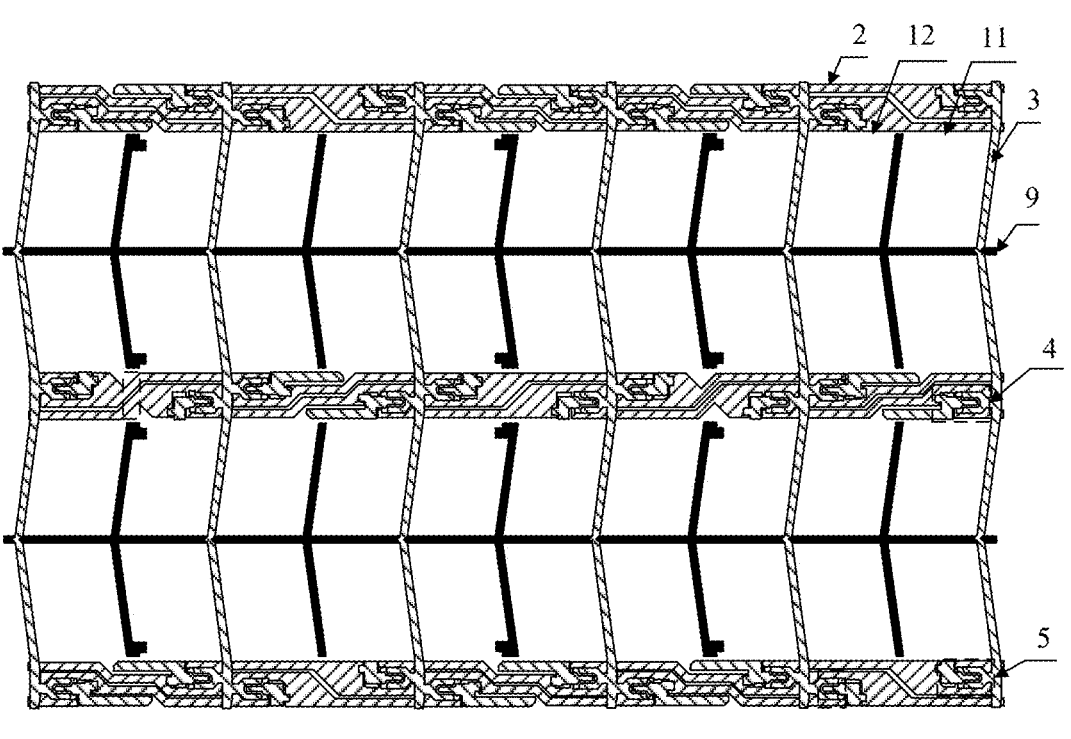
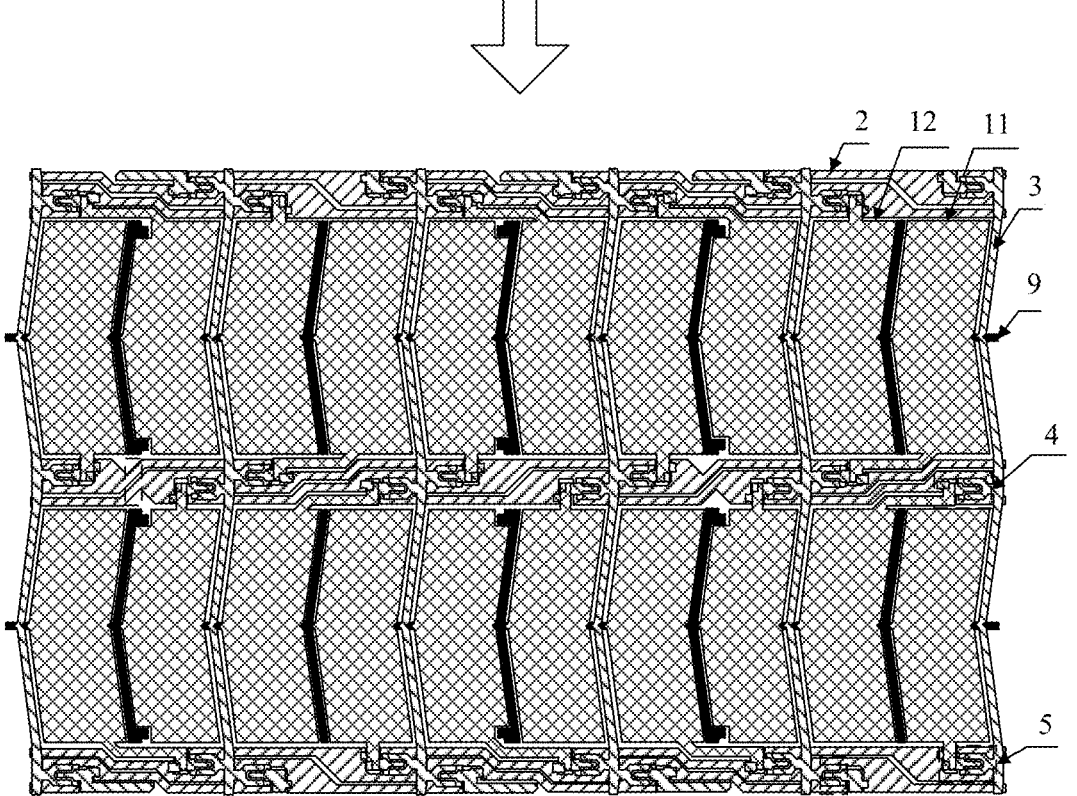
FIG. 24

ARRAY SUBSTRATE AND PREPARATION METHOD THEREFOR, AND DISPLAY PANEL

CROSS REFERENCE TO RELATED APPLICATION

The present disclosure is a National Stage of International Application No. PCT/CN2023/084774, filed on Mar. 29, 2023, the entire content of which is incorporated herein by reference.

TECHNICAL FIELD

The present disclosure relates to the field of a display technology, and in particular to an array substrate and a preparation method therefor, and a display panel.

BACKGROUND

An array substrate with a dual gate+Z architecture (dual gate architecture+pixel electrodes are distributed in Z shape) generally adopts the driving method of column inversion, so it has the advantage of lower power consumption.

However, distances between two pixel electrodes having the same gate and corresponding driver transistors in the above array substrate are different, so that coupling voltages of source-drain electrodes of the driver transistors are different, which results in different holding voltages of off-state pixels, thereby influencing the pixel electrodes and their brightness. When a user is viewing a display product including the above structure, if there is a relative displacement between the user and the display product (e.g., when the user shakes his or her head), the image viewed by the user will lose a positive frame or a negative frame, which results that the brightness of the positive and negative frames cannot be averaged, and thus a vertical stripe, which is also known as a shake-head stripe, appears.

SUMMARY

Embodiments of the present disclosure provide an array substrate and a preparation method therefor, and a display panel, for solving a technical problem of a shake-head stripe in the prior art.

In a first aspect, in order to solve the above technical problem, the embodiments of the present disclosure provide an array, including, a base substrate; a plurality of pixel pairs distributed in an array, where two gate lines are provided between two adjacent rows of pixel pairs, each of the plurality of pixel pairs incudes a first pixel electrode and a second pixel electrode arranged side by side, the first pixel electrode and the second pixel electrode are electrically connected with the same one data line, and the first pixel electrode is arranged at a side of the second pixel electrode away from the data line; a first pixel switch and a second pixel switch, electrically connected with the first pixel electrode and the second pixel electrode, respectively; where in an extension direction of the data line, the first pixel switch and the second pixel switch are distributed in pairs between two different pixel pairs, respectively, and a first pixel switch and a second pixel switch corresponding to a pixel pair are located at both sides of the pixel pair; the first pixel switch includes a first gate, a first electrode and a second electrode, the first gate is electrically connected with a gate line closest to the first pixel switch, the second electrode is electrically connected with a data line, and the first electrode is electrically connected with the first pixel electrode; and a first conductive structure, where at least part of the first conductive structure is located between two pixel pairs corresponding to each pair of first pixel switches; and in a direction perpendicular to the base substrate, the first conductive structure is at least partially overlapped with the gate lines, and in the extension direction of the data line, the first conductive structure is at least partially overlapped with the first electrode in the extension direction of the data line.

In a possible embodiment, the array substrate further includes: a common electrode, at least partially covering pixel pairs in the same row; first conductive structures in the same row are configured to electrically connect common electrodes in adjacent rows.

In a possible embodiment, the first conductive structure includes a first portion, a second portion, and a third portion connected in sequence; the first portion is connected between a common electrode corresponding to the second pixel electrode and the second portion, and the third portion is connected between a common electrode corresponding to a second pixel electrode in an adjacent row and the second portion; in an extension direction of the gate line, a width of the second portion is greater than a width of the first portion and the a width of third portion; and in the direction perpendicular to the base substrate, the first portion and the third portion are overlapped with the first electrode connected with respectively adjacent to the first portion and the third portion, respectively, and the second portion is partially overlapped with two gate lines electrically connected with a corresponding first pixel switch.

In a possible embodiment, in the extension direction of the data line, a length of the second portion is greater than or equal to a sum of widths of the two gate lines and a gap between the two gate lines.

In a possible embodiment, first conductive structures in the same row have the same extension direction.

In a possible embodiment, two adjacent rows of the first conductive structures have different extension directions.

In a possible embodiment, the array substrate further includes: a second conductive structure, located between two pixel pairs corresponding to a second pixel switch pair; an extension direction of the second conductive structure is parallel to the extension direction of the data line; and the second conductive structure is configured to electrically connects the common electrodes in adjacent rows; and in the direction perpendicular to the base substrate the second conductive structure is overlapped with the gate lines, and in the extension direction of the gate line, a width of the second conductive structure is less than a width of the first conductive structure.

In a possible embodiment, the common electrode includes a plurality of strip electrodes with different extension directions, where two ends of the plurality of strip electrodes with different extension directions are connected with each other.

In a possible embodiment, in the extension direction of the gate line, a width of a strip electrode that is overlapped with the data line is greater than a width of the data line.

In a possible embodiment, the array substrate further includes: a plurality of common electrode lines arranged cross-connectedly and extended along a row direction and a column direction, where each of the plurality common electrode lines corresponds to a row of the pixel pairs.

In a possible embodiment, the common electrode line includes: a straight-line main electrode line, arranged along a region where strip electrodes with different extension directions cross; and a plurality of branch electrode lines; where each of the plurality of branch electrode lines is located between the first pixel electrode and the second pixel electrode in each pixel pair, extension directions of the plurality of branch electrode lines are the same as the extension directions of the plurality of strip electrodes, and intersection points of the plurality of branch electrode lines with the main electrode line are arranged in a region where the strip electrodes with different extension directions are connected.

In a possible embodiment, the plurality of common electrode lines are provided in the same layer as the gate lines; and a branch electrode line is arranged at intervals with gate lines located at both sides of a corresponding pixel pair.

In a possible embodiment, a branch electrode line corresponding to a pixel pair having blue pixels further includes convex portions; and the convex portions are located at two ends of the branch electrode lines, respectively, and are raised toward a region where the blue pixels are located.

In a possible embodiment, the array substrate further includes: a first connection hole; in the direction perpendicular to the base substrate, at least part of the common electrode is electrically connected with a convex portion that is partially overlapped with the first connection hole.

In a possible embodiment, widths of second conductive structures corresponding to two branch electrode lines having convex portions with different orientations are different; and a width of a gate line at a position where it is overlapped with a wider one of the second conductive structures is greater than a width of a gate line at the position where it is overlapped with a narrower one of the second conductive structures.

In a possible embodiment, the first electrode includes: a first sub-portion, a second sub-portion, a third sub-portion, and a first connection sub-portion, where the first sub-portion, the second sub-portion, and the third sub-portion are all connected with the first connection sub-portion; in the extension direction of the gate line, the second sub-portion and the third sub-portion are located at a side of the first connection sub-portion away from the first sub-portion, and the first sub-portion is overlapped with the first gate, the second sub-portion is not overlapped with a corresponding gate line, and the third sub-portion is overlapped with a corresponding gate line; and the second sub-portion is connected with a corresponding the first pixel electrode, a length of the second sub-portion is greater than a length of the third sub-portion.

In a possible embodiment, the second pixel switch includes: a third electrode, electrically connected with the second pixel electrode, wherein the second electrode is not overlapped with the second conductive structure; a fourth electrode, electrically connected with the data line; and a second gate, electrically connected with a gate line closest to the second pixel switch.

In a possible embodiment, the third electrode includes: a fourth sub-portion, a fifth sub-portion, and a second connection sub-portion connecting the fourth sub-portion to the fifth sub-portion; where in the extension direction of the gate line, the fifth sub-portion is located at a side of the second connection sub-portion away from the fourth sub-portion; and the fourth sub-portion is overlapped with the second gate, and the fifth sub-portion is overlapped with a corresponding gate line.

In a possible embodiment, an overlapping area of the fifth sub-portion with the corresponding gate line is substantially the same as an overlapping area of the third sub-portion with the corresponding gate line.

In a possible embodiment, a length of the first electrode is greater than a length of the third electrode in the extension direction of the gate line; and first electrodes of a first pixel switch pair extend in the opposite directions.

In a possible embodiment, pixels in the same column have the same color; and pixel electrodes corresponding to blue and green, respectively, are electrically connected with the same one gate line.

In a possible embodiment, the data line is provided in the same layer as the first pixel electrode and the second pixel electrode.

In a second aspect, the embodiments of the present disclosure provide a display panel, including the array substrate as described in the first aspect and an opposite substrate; and a liquid crystal layer, located between the array substrate and the opposite substrate.

In a third aspect, the embodiments of the present disclosure provide a preparation method for the array substrate as described in the first aspect, including: providing the base substrate; forming a plurality of gate lines and a plurality of data lines on a side of the base substrate; where the plurality of gate lines and the plurality of data lines define a plurality of pixel pairs distributed in an array, the two gate lines are provided between the two adjacent rows of the pixel pairs; each of the plurality of pixel pairs includes the first pixel electrode and the second pixel electrode arranged side by side, the first pixel electrode and the second pixel electrode are electrically connected with the same one data line, and the first pixel electrode is arranged at the side of the second pixel electrode away from the data line; forming a first pixel switch and a second pixel switch on the side of the base substrate; where the first pixel switch and the second pixel switch are electrically connected with the first pixel electrode and the second pixel electrode, respectively; in the extension direction of the data line, the first pixel switch and the second pixel switch are distributed in pairs between two different pixel pairs, respectively, and a first pixel switch and a second pixel switch corresponding to a pixel pair are located at both sides of the pixel pair; and the first pixel switch includes a first gate, a first electrode and a second electrode, the first gate is electrically connected with the gate line closest to the first pixel switch, the second electrode is electrically connected with the data line, the first electrode is electrically connected with the first pixel electrode, the first electrode is at least partially overlapped with the second pixel electrode in the extension direction of the data line; and forming the first conductive structure on the side of the plurality of data lines away from the base substrate, where at least part of the first conductive structure is located between two pixel pairs corresponding to each pair of first pixel switches; and in the direction perpendicular to the base substrate the first conductive structure is at least partially overlapped with the gate lines, and in the extension direction of the data line, the first conductive structure is at least partially overlapped with the first electrode.

BRIEF DESCRIPTION OF FIGURES

FIG. 22 is a flowchart of a preparation method for an array substrate provided by an embodiment of the present disclosure.

FIG. 24 is a schematic diagram of forming data lines, a source-drain layer, first pixel electrodes and second pixel electrodes provided by an embodiment of the present disclosure.

Figure 1:
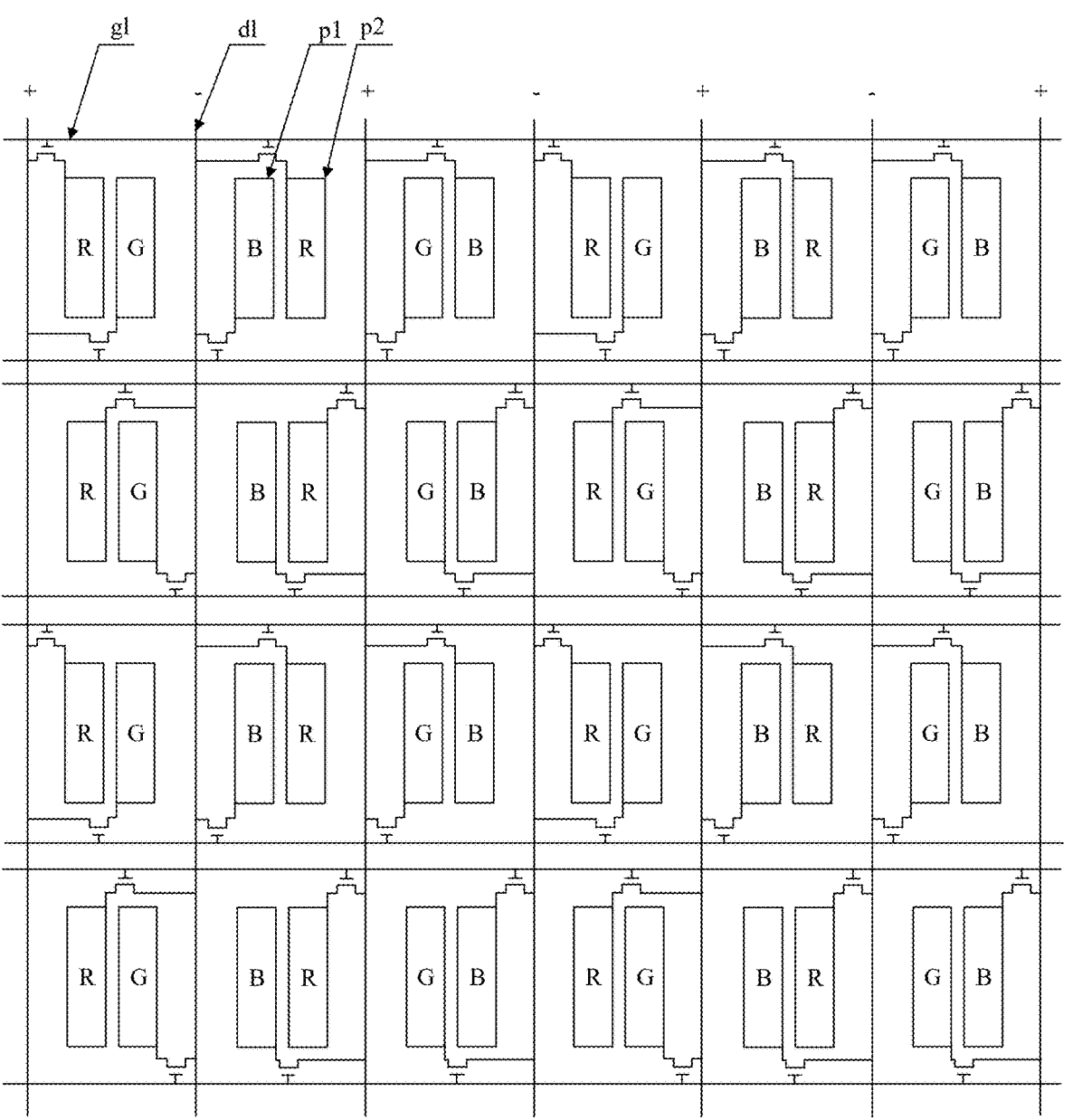
FIG. 1 is a schematic diagram of a pixel arrangement of a dual gate+Z architecture in the related art.

REFERENCE NUMERALS base substrate 0, pixel pair 1, gate line 2, data line 3, first pixel electrode 11, second pixel electrode 12, first pixel switch 4, second pixel switch 5, first conductive structure 6, first gate 4g, first electrode 41, second electrode 42, first pixel switch pair 4D, second pixel switch pair 5D, common electrode 7, second gate 5g, third electrode 51, fourth electrode 52, first portion 61, second portion 62, third portion 63, second conductive structure 8, strip electrode 71, common electrode line 9, main electrode line 91, branch electrode line 92, convex portion 921, the connection hole H, first sub-portion 411, second sub-portion 412, third sub-portion 413, first connection sub-portion 414, fourth sub-portion 511, fifth sub-portion 512, second connection sub-portion 513.

DETAILED DESCRIPTION

Embodiments of the present disclosure provide an array substrate and a preparation method therefor, and a display panel, for solving a technical problem of a shake-head stripe in the prior art.

In order to make the objectives, technical solutions and advantages of the embodiments of the disclosure clearer and more understandable, the present disclosure will be further described below in connection with the drawings and embodiments. However, the example embodiments are capable of being implemented in a variety of forms and should not be construed as being limited to the embodiments set forth herein; rather, these embodiments are provided to make the present disclosure more comprehensive and complete, and the ideas of the example embodiments can be fully communicated to those skilled in the art. The same labeling in the drawings denotes the same or similar structure, and thus the repeated description of them will be omitted. The words used to express the position and direction described in the present disclosure are illustrated with the drawings, but changes can be made as needed, and the changes made are included in the scope of protection of the present disclosure. The drawings of the present disclosure are only used to illustrate a relative position relationship and do not represent the true proportion.

It should be noted that specific details are set forth in the following description to facilitate a full understanding of the present disclosure. However, the present disclosure is capable of being implemented in a variety of other ways different from those described herein, and those skilled in the art may similarly generalize the present disclosure without violating its connotations. Thus the present disclosure is not limited by the specific embodiments disclosed below. The specification hereinafter describes the preferred embodiments for implementing the present application, but the description is intended to illustrate the general principles of the application and is not intended to limit the scope of the application. The scope of protection of this application shall be as defined in the appended claims.

Referring to FIG. 1 for a schematic diagram of a pixel arrangement of a dual gate+Z architecture in the related art.

As shown in FIG. 1, in a pixel p1 and a pixel p2 connected with the same one data line dl, the pixel p2 is farther away from the connected data line dl, making a connection line connecting the source/drain of the pixel p2 longer, and thus the pixel p2 is usually called a long connection pixel; the pixel p1 is closer to the connected data line dl, making a connection line connecting the source/drain of the pixel p1 shorter, and thus the pixel p1 is usually called a short connection pixel. The difference between the lengths of the connection lines corresponding to the above two types of pixels results in a difference in signals coupling to the gate line(s) gl.

Figure 2:
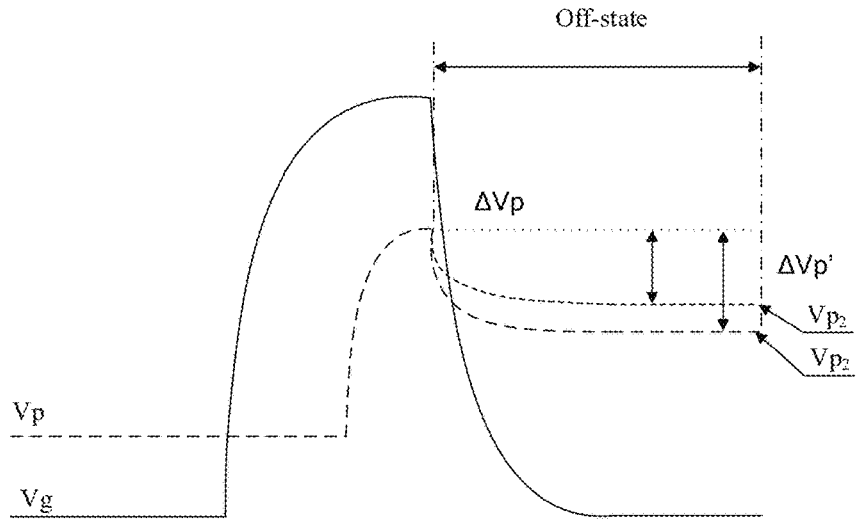
FIG. 2 shows a comparison of pixel coupling voltages of pixel switches corresponding to a long connection pixel and a short connection pixel, respectively, in an off-state.

Referring to FIG. 2 for a comparison of the pixel coupling voltages of the pixel switches corresponding to the long connection pixel and short connection pixel, respectively, in the off state. As shown in FIG. 2, due to the difference in the gate-source coupling capacitance (Cgs) caused by the difference between the lengths of the above mentioned connection lines corresponding to the long connection pixel and the short connection pixel, a voltage reacted in the pixel is the pixel coupling voltage ΔVp in the off-state, which affects the voltage (Vp) and the brightness of the pixel.

It should be understood that the above gate-source capacitance generally consists of a vertical coupling capacitance formed by overlapping the gate and the drain in a direction perpendicular to the display panel and a lateral coupling capacitance between the gate line and the above connection line in an extension direction of the data line.

In a positive frame: the long connection pixel is darker than the short connection pixel; in a negative frame: the long connection pixel is brighter than the short connection pixel; and the positive and negative frames are alternated to achieve an even distribution of light and dark. When the user is viewing the screen, if relative movement occurs with respect to the display screen (this thread is called head shaking), the user will visually lose a positive frame or a negative frame, resulting in the brightness and darkness of the positive and negative frame cannot be evenly distributed, thus resulting in the emergence of a vertical stripe, which is usually called a shake-head stripe.

In order to solve the above problem, embodiments of the present disclosure provide an array substrate and a preparation method therefor, and a display panel, which are described in detail below in conjunction with the drawings.

Figure 3:
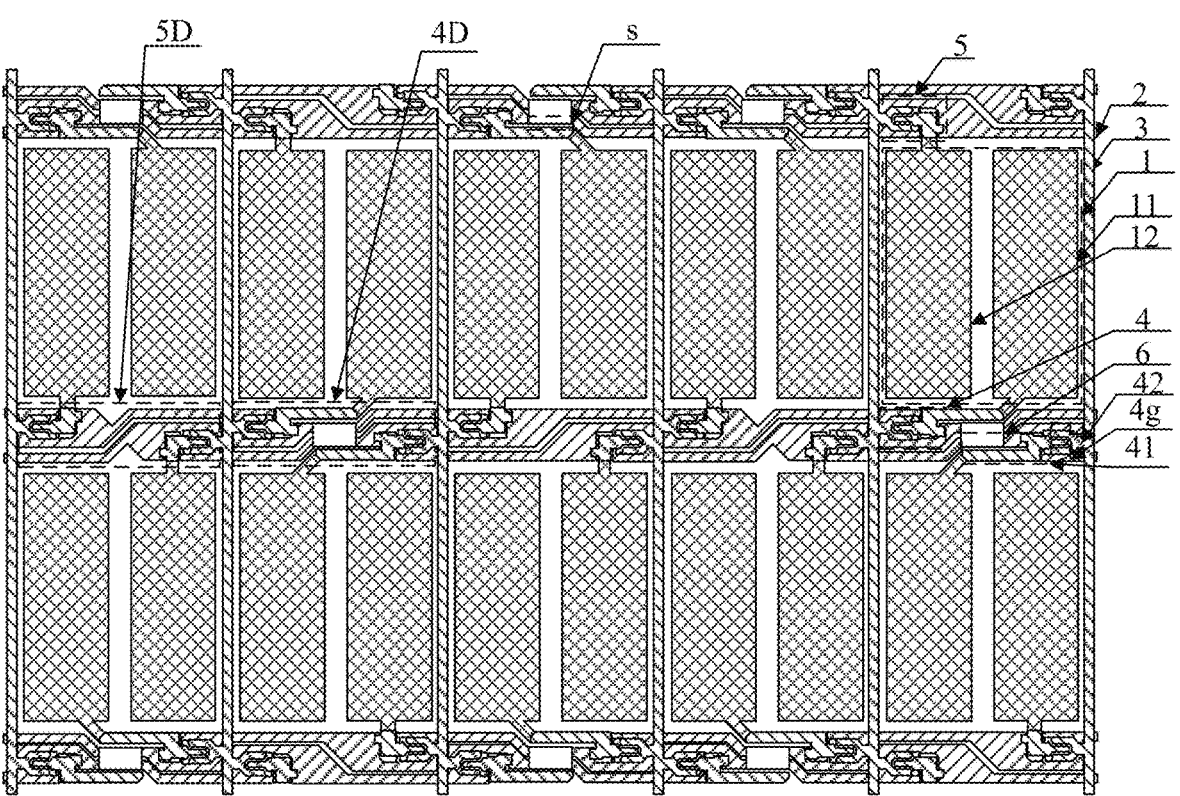
FIG. 3 is a schematic structural diagram of an array substrate provided by an embodiment of the present disclosure.

Referring to FIG. 3 for a schematic structural diagram of an array substrate provided by the embodiments of the present disclosure, the array substrate includes: a base substrate (not shown in FIG. 3); a plurality of pixel pairs 1 distributed in an array, where two gate lines 2 are provided between two adjacent rows of pixel pairs 1, each pixel pair 1 includes a first pixel electrode 11 and a second pixel electrode 12 arranged side by side, the first pixel electrode 11 and the second pixel electrode 12 are electrically connected with the same one data line 3, and the first pixel electrode 11 is arranged at a side of the second pixel electrode 12 away from the data line 3; a first pixel switch 4 and a second pixel switch 5, electrically connected with a first pixel electrode 11 and a second pixel electrode 12, respectively; where in an extension direction of a data line 3, the first pixel switch 4 and the second pixel switch 5 are distributed in pairs between two different pixel pairs 1 respectively, and the first pixel switch 4 and the second pixel switch 5 corresponding to the pixel pair 1 are located at both sides of the pixel pair 1; and the first pixel switch 4 includes a first gate 4g, a first electrode 41 and a second electrode 42, the first gate 4g is electrically connected with a gate line 2 closest to the first pixel switch 4, the second electrode 42 is electrically connected with a data line 3, and the first electrode 41 is electrically connected with the first pixel electrode 11; a first conductive structure 6, where at least part of the first conductive structure 6 is located between two pixel pairs 1 corresponding to each pair of first pixel switches; and in a direction perpendicular to the base substrate 0, the first conductive structure 6 is at least partially overlapped with the gate line 2, and in the extension direction of the data line 3, the first electrically conductive structure 6 is at least partially overlapped with the first electrode 41 (as shown in position s in FIG. 1).

The first conductive structure 6 may be loaded with a specified voltage signal, such as a common signal voltage.

In the embodiments provided by the present disclosure, by arranging pixel switches of the same type (the first pixel switch pair 4D or the second pixel switch pair 5D) between two adjacent pixel pairs 1 and providing the first conductive structure 6 at least partially overlapped with the gate line 2 between the first pixel switch pair 4D, and the first conductive structure 6 is at least partially overlapped with the first electrode 41 of the first pixel switch 4, so that the first conductive structure 6 can form a perpendicular electric field with the gate line 2, so as to reduce the lateral coupling capacitance formed between the gate line 2 and the first electrode 41 of the first pixel switch 4, thereby reducing the difference between the lateral coupling capacitances of the first pixel switch 4 and the second pixel switch 5 due to the fact that the first electrode 41 is longer than the third electrode 51, and making that the lateral coupling capacitance between the first electrode 41 of the first pixel electrode 11 and the gate line 2 is substantially the same as the lateral coupling capacitance between the third electrode 51 of the second pixel electrode 12 and the gate line 2. In this way, the voltages of the pixels of the first pixel switch 4 and the second pixel switch 5 in the off-state are substantially the same, and accordingly their corresponding pixel brightness is substantially the same. When the user views the display screen includes the array substrate provided by the embodiments of the present disclosure, even if the user moves relative to the display during viewing, there will be no uneven distribution of brightness and darkness visually due to the loss of a positive frame or a negative frame, which will ultimately achieve the purpose of alleviating the shake-head stripe of the display panel.

Figure 4:
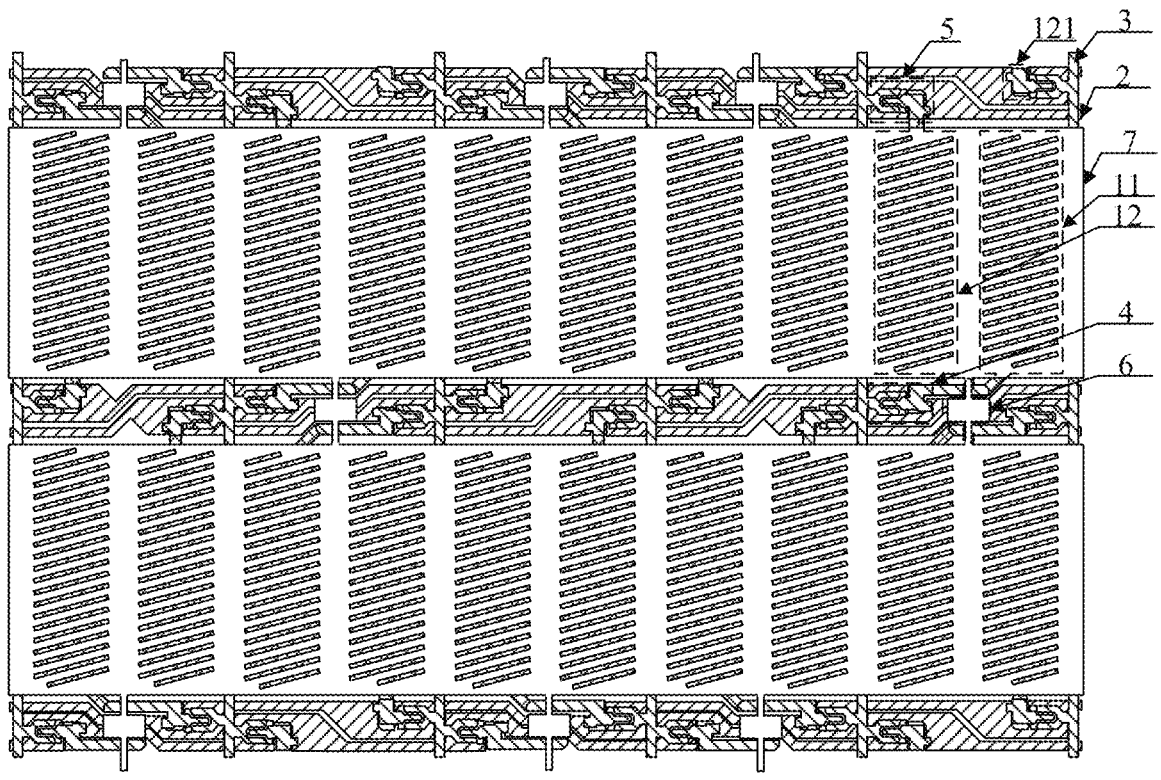
FIG. 4 is a schematic structural diagram of another array substrate provided by embodiments of the present disclosure.

Referring to FIG. 4 for a schematic structural diagram of another array substrate provided by the embodiments of the present disclosure. The array substrate further includes: a common electrode 7, at least partially covering a pixel pairs 1 in the same row; where first conductive structures 6 in the same one row are used to electrically connect common electrodes 7 in adjacent rows.

Figure 5:
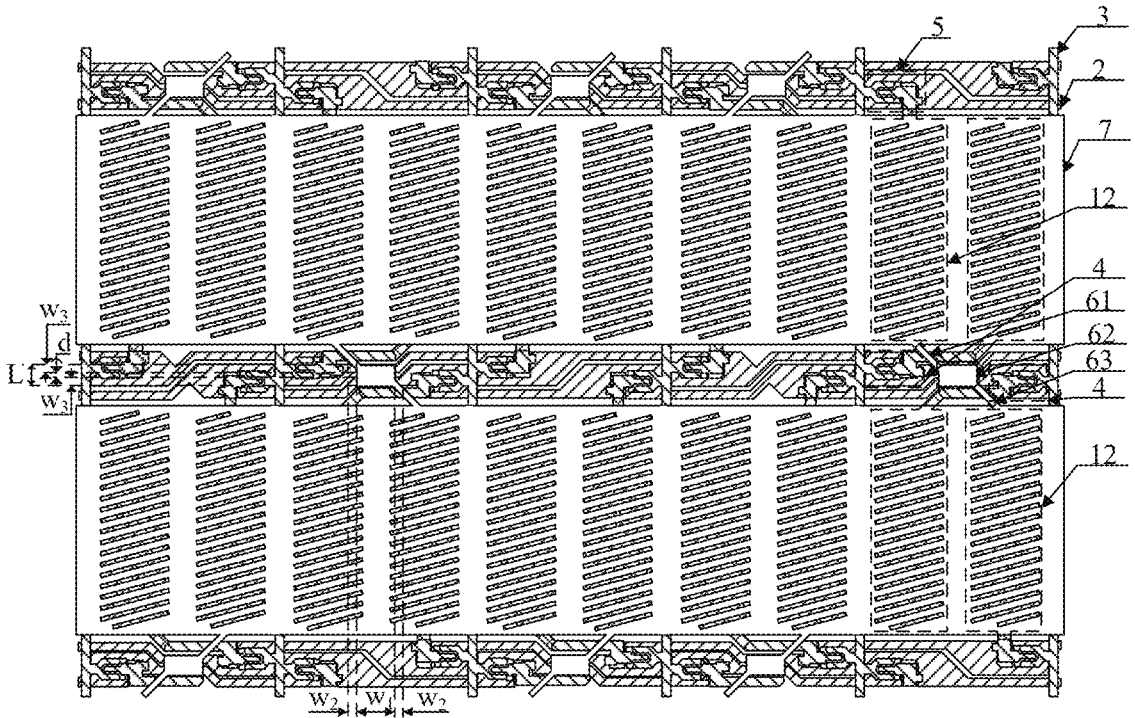
FIG. 5 is a schematic structural diagram of a first conductive structure provided by an embodiment of the present disclosure.

Referring to FIG. 5 for a schematic structural diagram of a first conductive structure provided by the embodiments of the present invention, the first conductive structure 6, includes a first portion 61, a second portion 62, and a third portion 63 connected in sequence; where the first portion 61 is connected between the common electrode 7 corresponding to the second pixel electrode 12 and the second portion 62, and the third portion 63 is connected between the common electrode 7 corresponding to a second pixel electrode 12 in an adjacent row and the second portion 62; in an extension direction of the gate line 2, a width $w_1$ of the second portion 62 is greater than a width $w_2$ of the first portion 61 and the third portion 63; and in a direction perpendicular to the base substrate (not shown in FIG. 5), the first portion 61 and the third portion 63 are overlapped with first electrodes 41 connected with second pixel electrodes 12 respectively adjacent to the first portion and the third portion, and the second portion 62 is partially overlapped with two gate lines 2 electrically connected with a corresponding first pixel switch 4.

The first conductive structure 6 may be provided in the same layer as the common electrode 7, so that the first conductive structure 6 can be used to reduce the lateral coupling capacitance formed between the first electrode 41 of the first pixel switch 4 and the gate line 2, and the first conductive structure 6 also can be used to connect the pixel electrodes in two adjacent rows.

In some embodiments, the width $w_1$ of the second portion 62 is the same as a length difference between the first electrode 41 and the third electrode 51 in the extension direction of the gate line 2, so that the second portion 62 can be utilized to effectively eliminate the difference between the lateral coupling capacitances of the first electrode 41 and the second electrode 42 with the gate line 2 due to the length difference between the first electrode 41 and the second electrode 42, and to prevent the emergence of the shake-head stripe.

In the embodiments provided by the present disclosure, the first portion 61 of the first conductive structure 6 is connected between the common electrode 7 corresponding to the second pixel electrode 12 and the second portion 62, and the third portion 63 is connected between the common electrode 7 corresponding to the second pixel electrode 12 in the adjacent row and the second portion 62, so that the first conductive structure 6 can be connected between the common electrodes 7 corresponding to the two second pixel electrodes 12 of the adjacent pixel pairs 1, reducing the lateral coupling capacitance between the first conductive structure 6 and the first electrode 41. In the extension direction of the gate line 2, the width $w_1$ of the second portion 62 is larger than the widths $w_2$ of the first portion 61 and the third portion 63, and the second portion 62 is overlapped with the two gate lines 2 electrically connected with the corresponding first pixel switch 4, so that the lateral coupling capacitance generated between a portion, the length of which is greater than the length of the third electrode 51, of the second electrode 42 and the grid lines 2 can be effectively shielded by the second portion 62, and so that the lateral coupling capacitance between the first electrode 41 of the first pixel switch 4 and the gate line 2 is substantially the same as the coupling capacitance between the third electrode 51 of the second pixel switch 5 and the gate line 2, thereby preventing the appearance of the shake-head stripe.

In some embodiments, in the extension direction of the data line 3, a length L of the second portion 62 is greater than or equal to a sum of widths $w_3$ of the two gate lines 2 and a gap d between the two gate lines 2.

Figure 6:
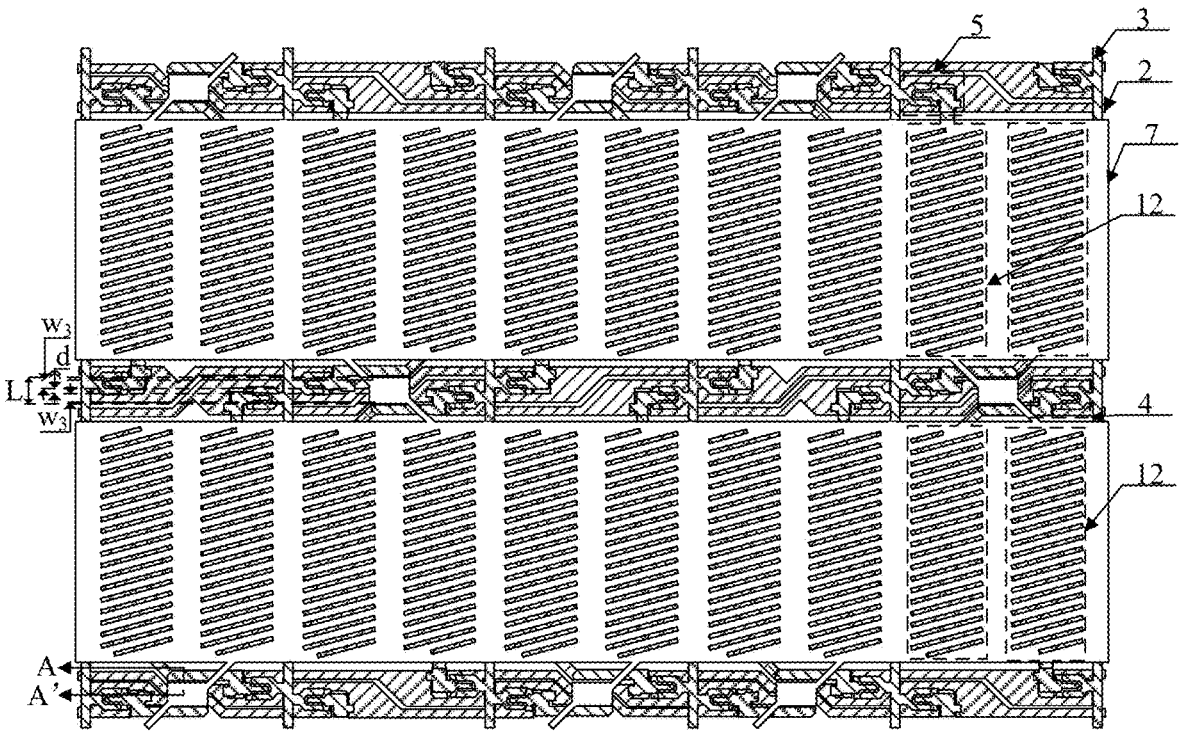
FIG. 6 is a schematic structural diagram of another first conductive structure provided by an embodiment of the present disclosure.

As shown in FIG. 5, $L=2w_{3+}d$. As shown in FIG. 6, a schematic structural diagram of another first conductive structure provided by the embodiments of the present disclosure, $L>2w_{3+}d$.

Figure 7:
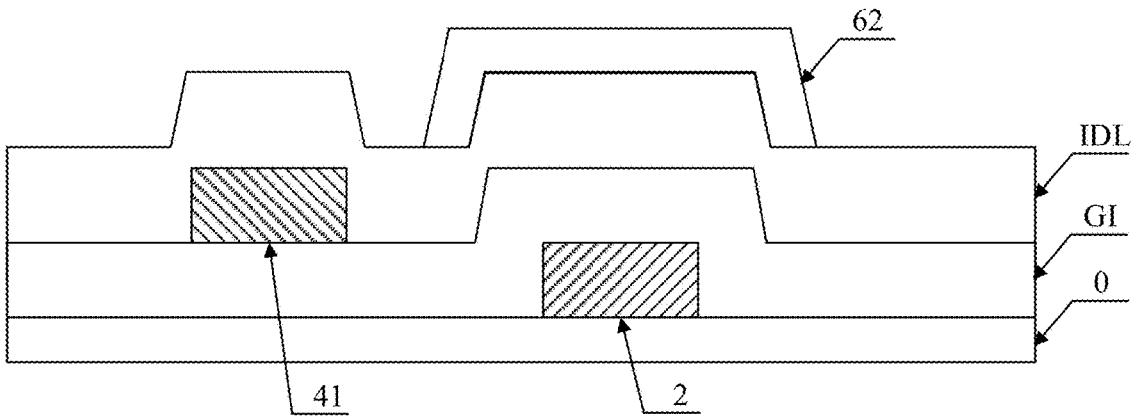
FIG. 7 is a sectional view at a position AA' in FIG. 6 provided by an embodiment of the present disclosure.

Referring to FIG. 7 for a sectional view of the position AA' in FIG. 6 provided by the embodiments of the present disclosure.

The gate line(s) 2 is provided on a side of the base substrate 0, a gate insulating layer GI is provided at a side of the gate line 2 away from the base substrate 0, the first electrode(s) 41 is located at a side of the gate insulating layer GI away from the gate line 2 and is not overlapped with the gate line 2; an interlayer dielectric layer IDL is provided at a side of the first electrode 41 away from the base substrate 0, and the first conductive structure(s) 6 is provided at a side of the interlayer dielectric layer IDL away from the base substrate 0, and the second portion(s) 62 of the first conductive structure 6 is overlapped with the gate line 2. In FIG. 7, in the extension direction of the data line 3, since the length L of the second portion 62 of the first conductive structure 6 is greater than or equal to the sum of the widths $w_3$ of the two gate lines 2 and the gap d between the two gate lines 2, in the process of fabricating the array substrate, the part of the second portion 62 that exceeds at the width of the gate line 2 will extend towards the gate lines 2 from the side surface due to the deposition process of the respective film layers, so as to play a better shielding effect on the signal on gate line 2, which in turn can better reduce the lateral coupling capacitance between the gate line 2 and the first electrode 41, thereby preventing the appearance of the shake-head stripe.

In some embodiments, first conductive structures 6 in the same row have the same extension direction, as shown in FIGS. 5 and 6.

In other embodiments, two adjacent rows of first conductive structures 6 have different extension directions.

It should be understood that an extension direction of the first portion 61 or the third portion 63 of the first conductive structure 6 is considered as the extension direction of the first conductive structure 6.

In the embodiments provided by the present disclosure, by setting the extension directions of the first conductive structures 6 in the same row to be the same, and setting the extension directions of the two adjacent rows of the first conductive structures 6 to be different, it is possible to better adapt to the arrangement of the first pixel electrodes 11 and the second pixel electrodes 12 in different pixel rows.

Figure 8:
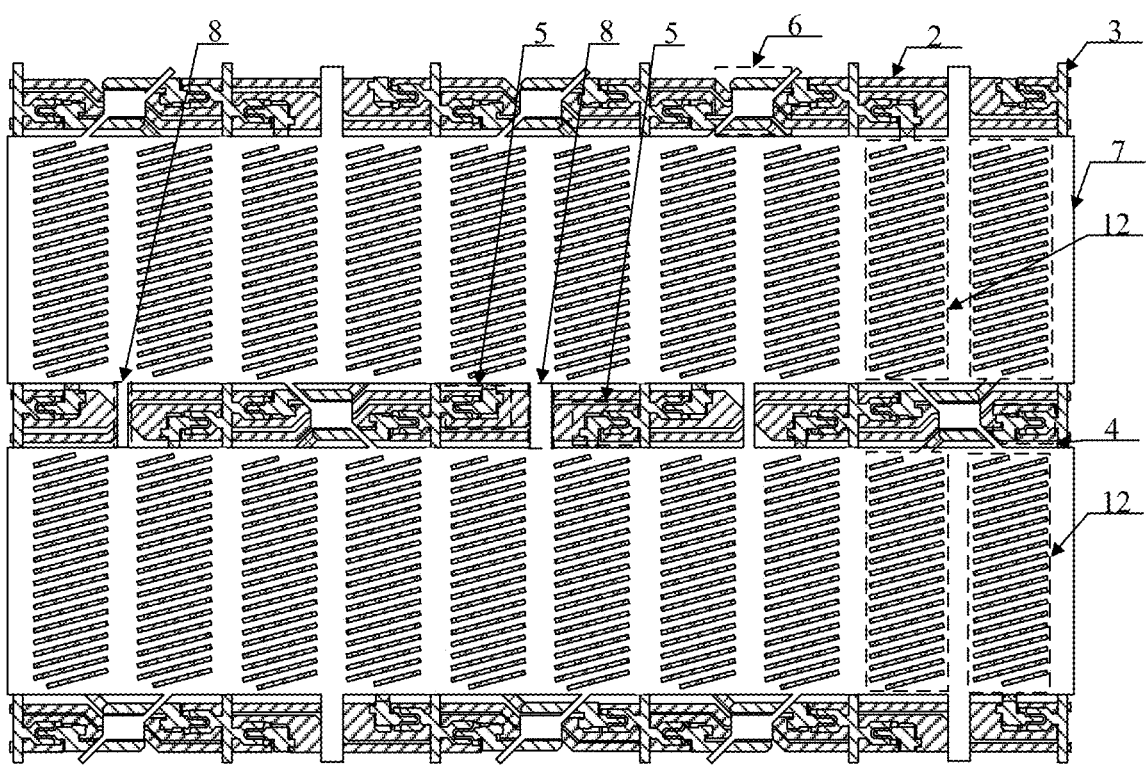
FIG. 8 is a schematic structural diagram of a second conductive structure provided by an embodiment of the present disclosure.

Referring to FIG. 8 for a schematic structural diagram of a second conductive structure provided by the embodiments of the present disclosure. The array substrate further includes: a second conductive structure 8, located between two pixel pairs 1 corresponding to a second pixel switch pair 5D, where an extension direction of the second conductive structure 8 is parallel to the extension direction of the data line 3.

The second conductive structure 8 is configured to electrically connect the common electrodes 7 in adjacent rows, and the second conductive structure 8 is overlapped with the gate line 2 in the direction perpendicular to the base substrate 0, and in the extension direction of the gate line 2, a width of the second conductive structure 8 is less than a width of the first conductive structure 6.

In the case that the first conductive structure 6 includes a first portion 61, a second portion 62 and a third portion 63, the width of the first conductive structure 6 is the width of the second portion 62 in the extension direction of the gate line 2.

In the embodiments provided by the present disclosure, the second conductive structure 8 is provided in the same extension direction as the extension direction of the data line 3 and is provided between two pixel pairs 1 corresponding to each second pixel switch pair 5D, and the second conductive structure is connected between the common electrodes 7 in the adjacent rows, which can increase the connection points of the common electrodes 7 in the adjacent rows to equalize the common electrodes 7 in the regions where the different pixel pairs 1 are located.

As shown in FIG. 8, the widths of the second conductive structures 8 at different positions may be different, and a width of the gate line 2 at a position where it is overlapped with the wider second conductive structure 8 is greater than a width of the gate line at a position where it is overlapped with the narrower second conductive structure 8.

By setting the width of the gate line 2 at the position where it is overlapped with the wider second conductive structure 8 to be greater than the width of the gate line at the position where it is overlapped with the narrower second conductive structure 8, the resistances of the common electrodes 7 at different pixel pairs 1 can be optimized to provide a homogeneity of the gate signals and the resistances of the common electrodes 7.

Figure 9:
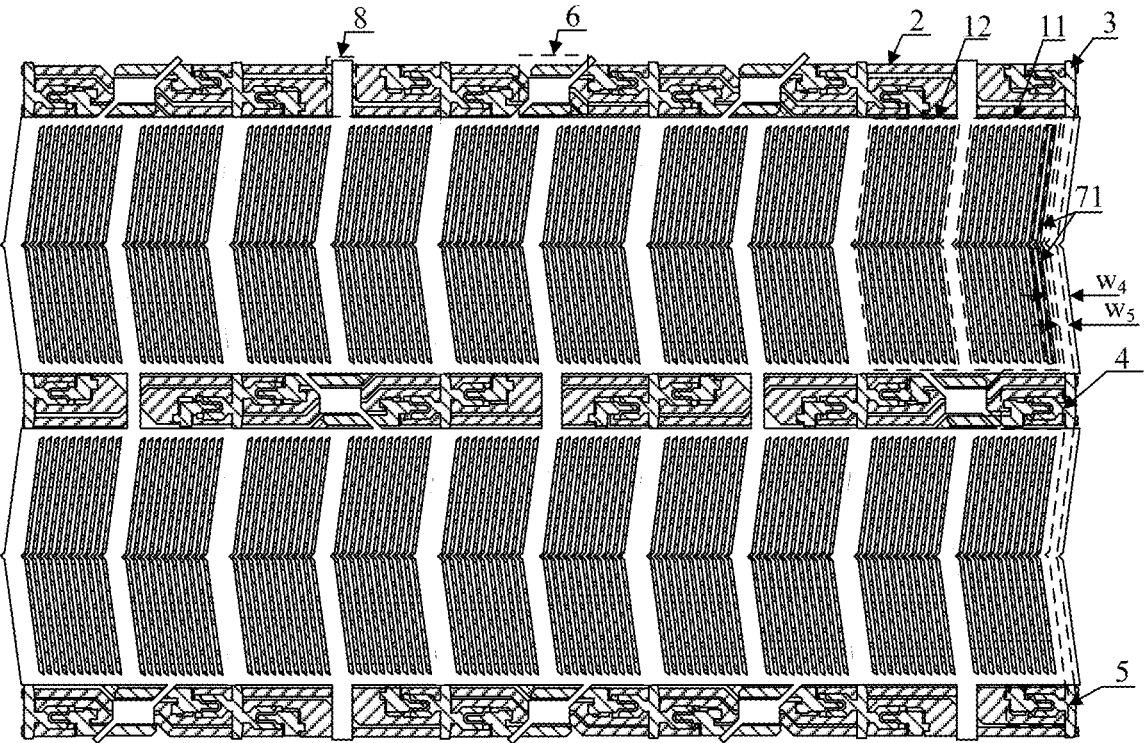
FIG. 9 is a schematic structural diagram of a common electrode provided by an embodiment of the present disclosure.

Referring to FIG. 9 for a schematic structural diagram of a common electrode provided by the embodiments of the present disclosure. The common electrode 7 in the array substrate includes: a plurality of strip electrodes 71 with different extension directions, two ends of the plurality of strip electrodes 71 with different extension directions being connected with each other.

In the embodiments provided by the present disclosure, the plurality of strip electrodes 71 with different extension directions are provided in the common electrode 7, and the two ends of the plurality of strip electrodes 71 with different extension directions are connected with each other (i.e., the plurality of strip electrodes 71 are connected with each other by electrodes extending along the extension direction of the gate line 2 at a position close to the gate line 2), which can cause the common electrode 7 and the pixel electrodes to generate the horizontal electric field between for driving the rotation of the liquid crystal.

Referring further to FIG. 9, in the extension direction of the gate line 2, a width $w_4$ of the strip electrode 71 that is overlapped with the data line 3 is greater than a width $w_5$ of the data line 3.

In the embodiments provided by the present disclosure, the width $w_4$ of the strip electrode 71 that is overlapped with the data line 3 is larger than the width $w_5$ of the data line 3 in the extension direction of the gate line 2, which can prevent the generation of a horizontal electric field in the vicinity of the data line 3 that affects the data signals and prevent electromagnetic interference to the data signals.

The first pixel electrode 11, the second pixel electrode 12 and the data line 3 may be made of the same transparent conductive material, or the first pixel electrode 11 and the second pixel electrode 12 may be made of a transparent conductive material such as an indium tin oxide (ITO) material, and the data line 3 may be made of a non-transparent conductive material such as a metallic material.

When the first pixel electrode 11 and the second pixel electrode 12 are made of the same material as the data line 3, the first pixel electrode 11, the second pixel electrode 12, the data line 3, the first electrode 41 and the second electrode 42 of the first pixel switch 4, and the source-drain of the third pixel switch may be formed by one mask, at which time the first electrode 41 is directly connected with the first pixel electrode 11.

When the first pixel electrode 11 and the second pixel electrode 12 are made of different material from the data line 3, the first electrode 41 is connected with the first pixel electrode 11 by overlapping, and the overlapping position is located in a non-opening region of the pixel.

In the embodiments provided by the present disclosure, the first pixel electrode 11 and the second pixel electrode 12 may be provided in the same layer with the data line 3, which can effectively reduce the number of the film layers and make the array substrate thinner and lighter, and at the same time, it can also effectively economize the process, improve the production efficiency, and reduce the production cost.

Figure 10:
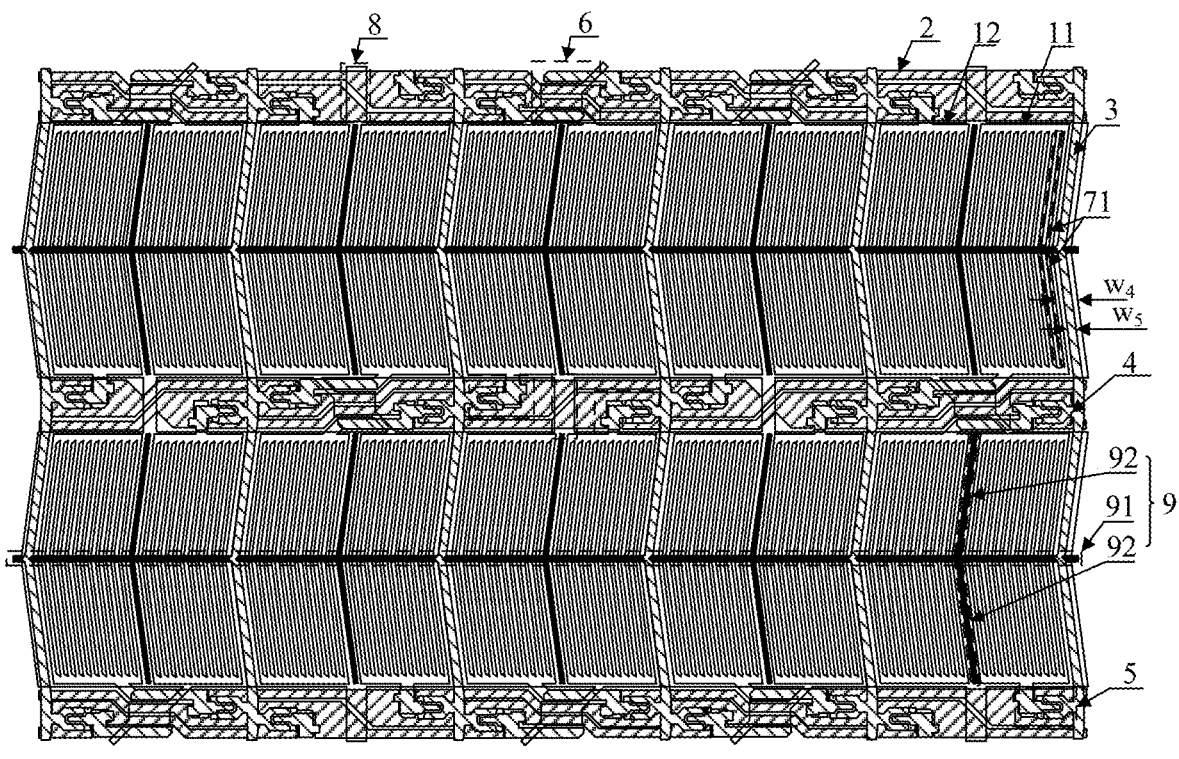
FIG. 10 is a schematic structural diagram of another array substrate provided by an embodiment of the present disclosure.

Referring to FIG. 10 for a schematic structural diagram of another array substrate provided by the embodiments of the present disclosure. The array substrate further includes: a plurality of common electrode lines 9 arranged cross-connectedly and extended along the row direction and the column direction, a common electrode line 9 corresponding to a row of pixel pairs 1.

Referring further to FIG. 10, each common electrode line 9 includes: a straight-line main electrode line 91, arranged along a region where strip electrodes 71 with different extension directions cross; a plurality of branch electrode lines 92, where each branch electrode line 92 is located between the first pixel electrode 11 and the second pixel electrode 12 in each pixel pair 1, extension directions of the branch electrode lines 92 are the same as the extension directions of the strip electrodes 71, and intersection points of the branch electrode lines 92 with the main electrode line 91 are arranged in a region where the strip electrodes 71 with the different extension directions are connected.

In the embodiments provided by the present disclosure, by providing the branch electrode lines 92 having the same extension direction as the strip electrodes 71 between the first pixel electrode 11 and the second pixel electrode 12 of the pixel pair 1, the branch electrode lines 92 can be utilized to block the backlight of the pixels with different colors in the pixel pair 1, so that even if an alignment deviation arises when different film layers of the array substrate are produced, the branch electrode line 92 can be utilized to prevent color mixing of the pixels in the pixel pair 1; and by providing the straight-line main electrode lines 91 at the intersection of the strip electrodes 71 with different extension directions, the main electrode lines 91 can be utilized to connect the branch electrode lines 92 in the same row to form mesh common electrode lines 9 and to reduce the resistances of the common electrode lines 9.

Please continue to refer to FIG. 10, the common electrode lines 9 are arranged in the same layer as the gate lines 2, and a branch electrode line 92 is arranged at intervals with gate lines 2 located at both sides of a corresponding pixel pair 1.

In the embodiments provided by the present disclosure, by arranging the branch electrode line 92 and the gate lines 2 located at both sides of the corresponding pixel pair 1 at intervals, the common electrode lines 9 and the gate lines 2 can be arranged in the same film layer, and the common electrode lines 9 and the gate lines 2 can be formed through one mask, which can efficiently save the process and material, improve the production efficiency, and reduce the production cost. At the same time, since the common electrode lines 9 and the gate lines 2 can be formed at the same time by using one mask, the alignment error generated when forming them with different mask can be eliminated, and the product yield can be improved.

Figure 11:
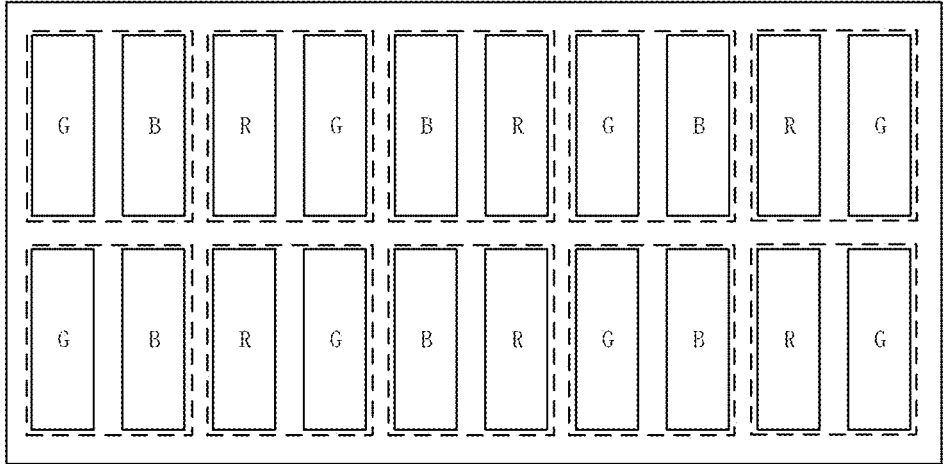
FIG. 11 is a schematic diagram of an arrangement of a color film corresponding to pixels in an array substrate provided by an embodiment of the present disclosure.
Figure 12:
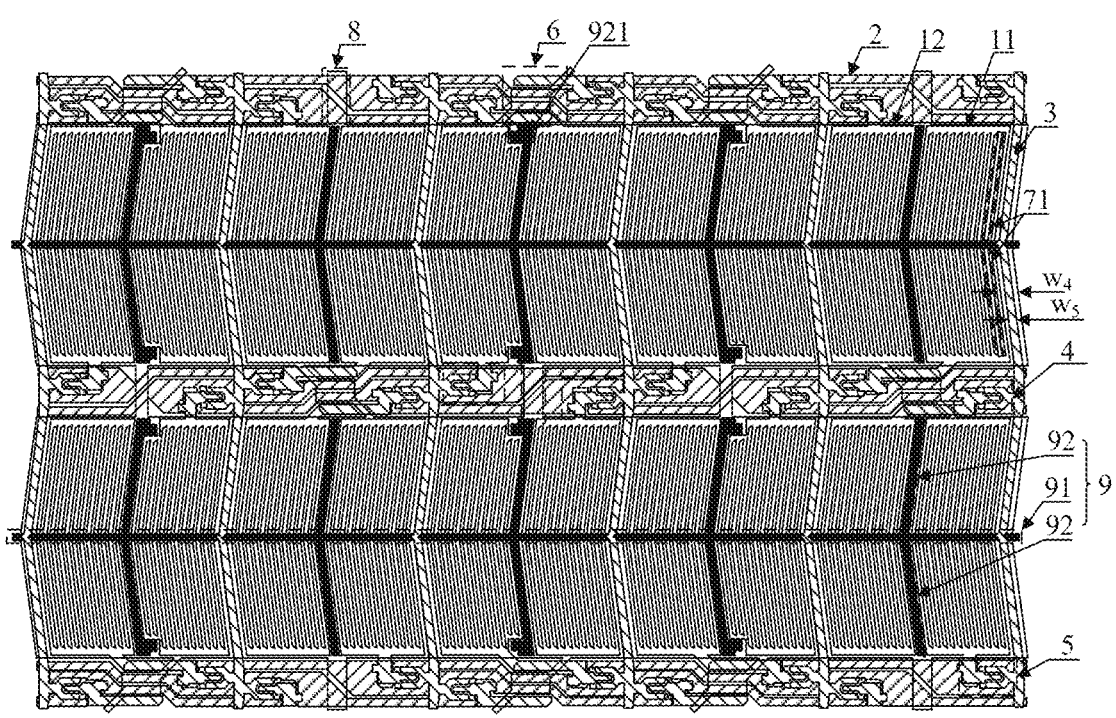
FIG. 12 is a schematic structural diagram of another array substrate provided by an embodiment of the present disclosure.

Referring to FIG. 11 and FIG. 12, FIG. 11 shows a schematic diagram of an arrangement of pixels corresponding to a color film in an array substrate provided by the embodiments of the present disclosure, and FIG. 12 shows a schematic structural diagram of another array substrate provided by the embodiments of the present disclosure. A branch electrode line 92 corresponding to a pixel pair 1 corresponding to blue pixels further includes convex portions 921.

The convex portions 921 are respectively located at two ends of the corresponding branch electrode line 92, and are raised toward a region where the blue pixels are located.

FIG. 11 illustrates the arrangement of color resists corresponding to each pixel pair 1, and FIG. 12 illustrates the setting position of the convex portion 921 in the array substrate corresponding to FIG. 11. That is, the convex portion 921 is provided at an end of the branch electrode line 92 of the pixel pair 1 in which the blue pixel (i.e., the pixel corresponding to the color resist B in FIG. 11) is located close to the gate line 2, and the convex portion 921 is raised toward the blue pixel.

If the color resist is directly provided in the array substrate, the above blue pixel is a pixel corresponding to the blue color resist in the array substrate.

If the color resist is not provided in the array substrate, but the color resist is provided in the color filter substrate opposite the array substrate, the above blue pixel is the pixel in the array substrate corresponding to a blue color resist in the color film substrate.

In the embodiments provided by the present disclosure, by providing the convex portion 921 at the end of the branch electrode line 92 close to the gate line 2, it is convenient to provide a connection hole in which the common electrode line 9 is connected with the common electrode 7 at the corresponding position of the convex portion 921; and since the brightness of the blue pixel is usually lower than that of the red pixel and the green pixel, the convex portion 921 is provided at the branch electrode line 92 corresponding to the blue pixels pair 1, which can minimize the effect of the connection holes on the transmittance of the display panel.

It should be noted that in FIG. 10 and FIG. 12, only the contour lines of the first pixel electrode 11, the second pixel electrode 12, and the common electrode 7 are retained in order to facilitate the observation of the relationship between the common electrode line 9 and the first pixel electrode 11, the second pixel electrode 12, and the strip electrodes 71 of the common electrode 7.

Figure 13:
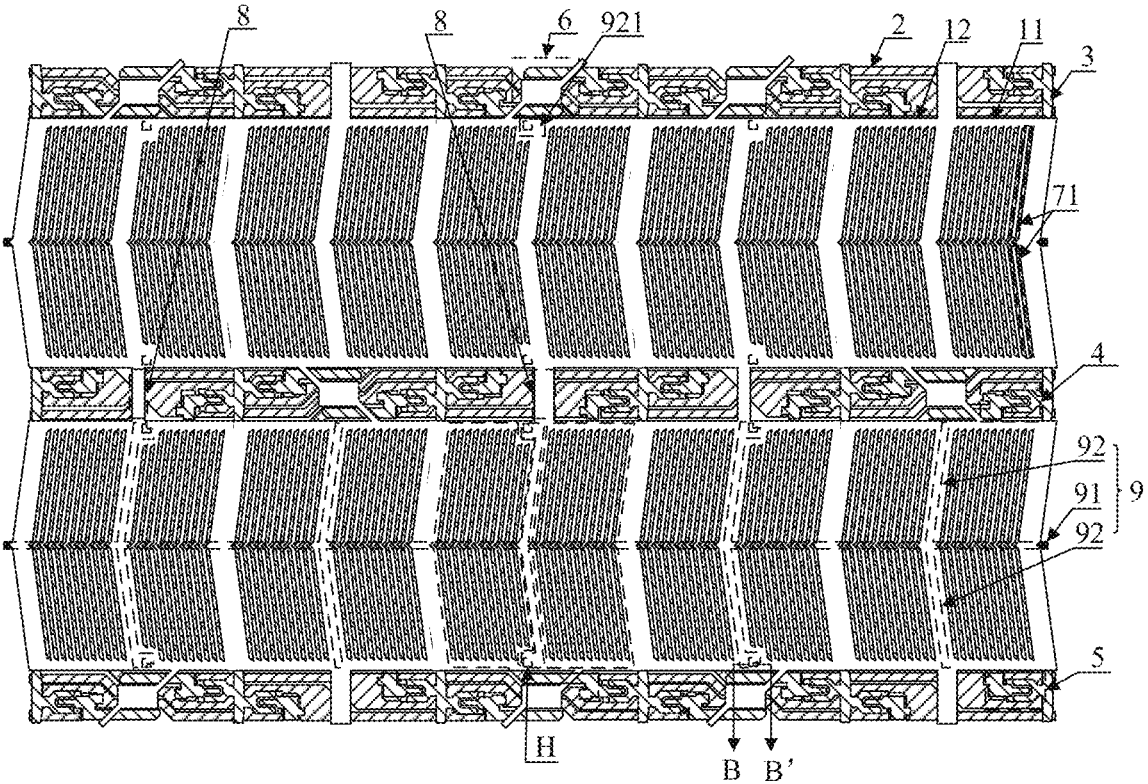
FIG. 13 is a schematic diagram of a position of a connection hole in an array substrate provided by an embodiment of the present disclosure.
Figure 14:
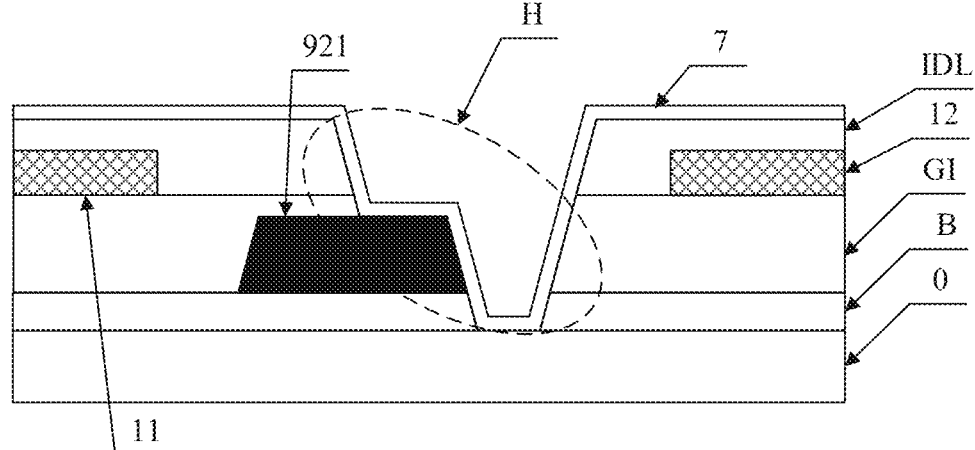
FIG. 14 is a sectional view at a position BB' in FIG. 13 provided by an embodiment of the present disclosure.

Referring to FIG. 13 and FIG. 14, FIG. 13 is a schematic diagram of a position of a connection hole in an array substrate provided by the embodiments of the present disclosure, and FIG. 14 is a sectional view of the position BB' in FIG. 13 provided by the embodiments of the present disclosure.

The array substrate further includes: a connection hole H, where in a direction perpendicular to the base substrate 0, at least part of the common electrode 7 is electrically connected with a convex portion 921 that is partially overlapped with the connection hole H.

When the gate lines 2 are provided in the same layer as the common electrode lines 9, the connection hole H is provided only at an edge position of the convex portion 921 as shown in FIG. 13, and the corresponding sectional view is shown in FIG. 14. There is also a buffer layer B between a film layer where the gate lines 2 are located and the base substrate 0 in FIG. 14.

When the connection hole H is etched using the through-hole etching process, when the etching reaches the metal or the base substrate 0, the etching will be stopped because the hardness of the metal or the base substrate is different from that of the other film layers, and thus, when the common electrode 7 is formed, half of the common electrode 7 in the connection hole H can be lapped on the convex portion 921 inside the connection hole H, and another half of the common electrode 7 in the connection hole H can be lapped on the base substrate 0 (shown in FIG. 14).

In the embodiments provided by the present disclosure, by providing the connection holes H in the array substrate in the direction perpendicular to the base substrate 0, at least part of the common electrode 7 is electrically connected with the convex portion 921 in the connection hole H, which can reduce the impedance between the common electrode 7 and the common electrode line 9. Furthermore, since a portion of the common electrode 7 in the connection hole H is connected with the convex portion 921 and another portion of the common electrode 7 in the connection hole H is connected with the base substrate 0, this via-hole design with a shape similar to a ladder facilitates the flow of the orientation liquid, which can improve the alignment homogeneity. Herein, the orientation film formed by the orientation liquid is provided on the side of the common electrode 7 away from the base substrate 0.

When the data lines 3 are provided in a different layer from the layer where the first pixel electrodes 11 and the second pixel electrodes 12 are located, a connection hole through which the first electrode 41 is electrically connected with the first pixel electrode 11 or a connection hole through which the third electrode 51 is electrically connected with the second pixel electrode 12 may also be provided in a similar manner of the connection hole H through which the common electrode 7 is electrically connected with the common electrode line 9 as described above, and will not be repeated herein.

Please continue to refer to FIG. 13, widths of second conductive structures 8 corresponding to two branch electrode lines 92 having convex portions 921 with different orientations are different; and the width of the gate line 2 at the position where it is overlapped with the wider one of the second conductive structures 8 is greater than the width of the gate line 2 at the position where it is overlapped with the narrower one of the second conductive structures 8.

In the embodiments provided by the present disclosure, by setting the widths of the second conductive structure 8 corresponding to the two branch electrode lines 92 having the convex portion 921 with different orientations, and by setting the width of the of the gate line 2 at the position where it is overlapped with the wider second conductive structure 8 to be greater than the width of the gate line 2 at the position where it is overlapped with the narrower second conductive structure 8, the homogeneity between the signal loads on the gate line 2 and the impedance of the common electrode 7 may be improved, thereby improving the display effect.

Figure 15:
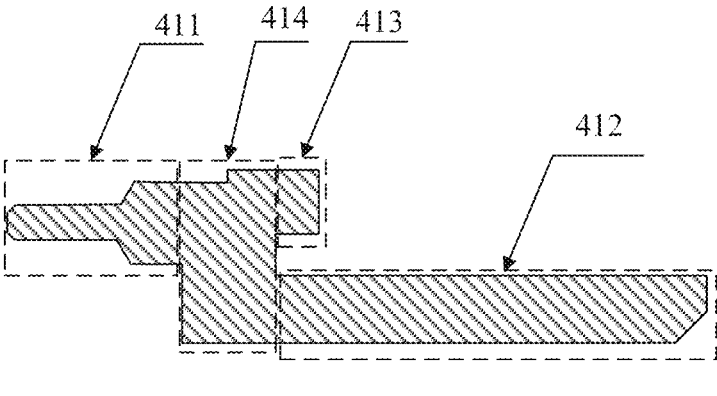
FIG. 15 is a schematic structural diagram of a first electrode provided by an embodiment of the present disclosure.

Referring to FIG. 15 for a schematic structural diagram of the first electrode provided by the embodiments of the present disclosure.

A first sub-portion 411, a second sub-portion 412, a third sub-portion 413, and a first connection sub-portion 414 are provided, and the first sub-portion 411, the second sub-portion 412, and the third sub-portion 413 are all connected with the first connection sub-portion 414.

In the extension direction of the gate line 2, the second sub-portion 412 and the third sub-portion 413 are located at a side of the first connection sub-portion 414 away from the first sub-portion 411, and the first sub-portion 411 is overlapped with the first gate 4g, the second sub-portion 412 is not overlapped with the corresponding gate line 2, and the third sub-portion 413 is overlapped with the corresponding gate line 2.

The second sub-portion 412 is connected with a corresponding first pixel electrode 11, and a length of the second sub-portion 412 is greater than a length of the third sub-portion 413.

In embodiments provided by the present disclosure, the first electrode 41 is arranged to include the first sub-portion 411, the second sub-portion 412, the third sub-portion 413, and the first connection sub-portion 414, and the first sub-portion 411, the second sub-portion 412, and the third sub-portion 413 are all arranged to be connected with the first connection sub-portion 414. The first sub-portion 411 is arranged to be overlapped with the first gate electrode 4g, the second sub-portion 412 is arranged to be not overlapped with the corresponding gate line 2, and the third sub-portion 413 is arranged to be overlapped with the corresponding gate line 2. The third sub-portion 413 can be utilized to, when fabricating the different film layers of the first pixel switch 4, compensate for the change amount in the vertical coupling capacitance between the first electrode 41 and the gate in the direction perpendicular to the base substrate 0 due to the alignment deviation, so that the vertical coupling capacitance is always kept constant.

Figure 16:
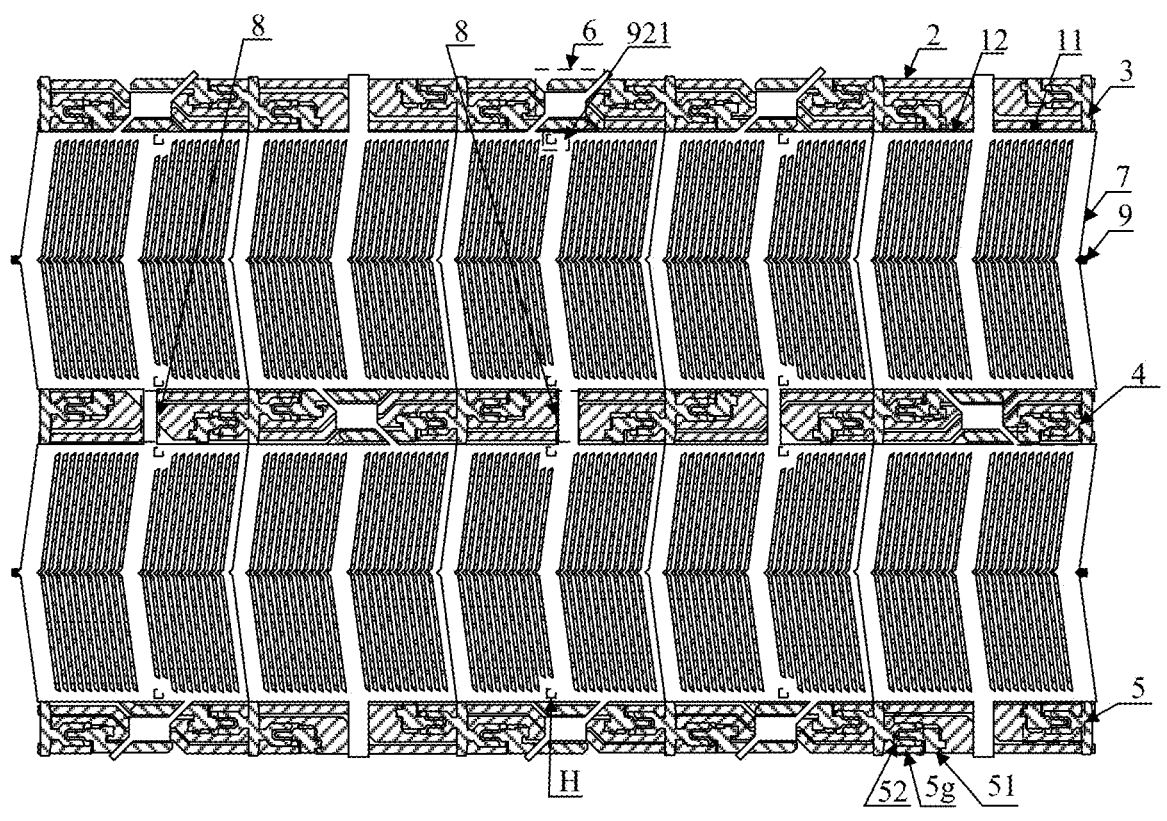
FIG. 16 is a schematic structural diagram of a second pixel switch provided by an embodiment of the present disclosure.

Referring to FIG. 16 for a schematic structural diagram of a second pixel switch provided by the embodiments of the present disclosure.

The second pixel switch 5 includes: a third electrode 51, electrically connected with the second pixel electrode 12, where the second electrode 42 is not overlapped with the second conductive structure 8; a fourth electrode 52, electrically connected to the data line 3; and a second gate 5g, electrically connected with a gate line 2 closest to the second pixel switch 5. As shown in FIG. 16, the portion of the gate line 2 that is overlapped with the second pixel switch 5 is multiplexed as the second gate.

In the embodiments provided by the present disclosure, by multiplexing the portion of the gate line 2 as the second gate, the aperture ratio of the pixel corresponding to the second pixel electrode 12 can be increased.

Figure 17:
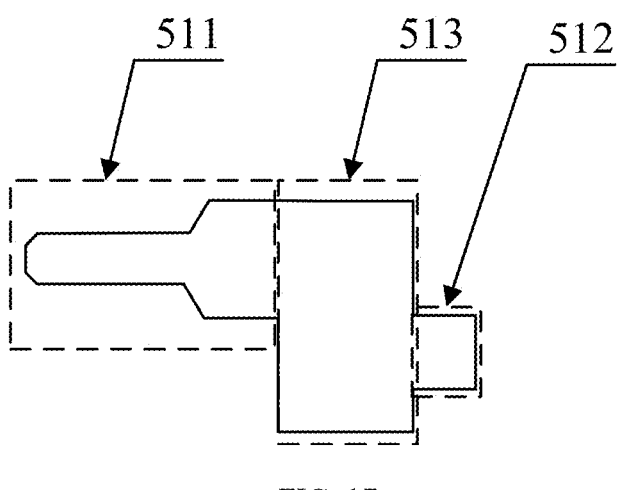
FIG. 17 is a schematic structural diagram of a third electrode provided by an embodiment of the present disclosure.

Referring to FIG. 17 for a schematic structural diagram of a third electrode provided by the embodiments of the present disclosure. The third electrode 51 includes: a fourth sub-portion 511, a fifth sub-portion 512, and a second connection sub-portion 513 connecting the fourth sub-portion 511 and the fifth sub-portion 512; where in the extension direction of the gate line 2, the fifth sub-portion 512 is located at a side of the second connection sub-portion 513 away from the fourth sub-portion 511.

The fourth sub-portion 511 is overlapped with the second gate, and the fifth sub-portion 512 is overlapped with a corresponding gate line 2.

In embodiments provided by the present disclosure, by overlapping the fifth sub-portion 512 with the corresponding gate line 2, the fifth sub-portion 512 can be utilized to, when fabricating different film layers of the second pixel switch 5, compensate for the change amount in the vertical coupling capacitance between the third electrode 51 and the gate in the direction perpendicular to the base substrate 0 due to the alignment deviation, so that the vertical coupling capacitance is always kept constant.

In some embodiments, an overlapping area of the fifth sub-portion 512 with the corresponding gate line 2 is substantially the same as an overlapping area of the third sub-portion 413 with the corresponding gate line 2.

Since there exists a certain error in forming both the gate line layer and the source-drain layer, such as an error of 1×1 um, the overlapping area of the fifth sub-portion 512 with the corresponding gate line 2 and the overlapping area of the third sub-portion 413 with the corresponding gate line 2 are substantially the same, that is, it is shown that their overlapping area errors within 1×1 um can be regarded as both of them having substantially the same overlapping area as each other.

Generally, the overlapping area of the source-drain of the first pixel switch 4 and the gate line 2 is the same as the overlapping area of the source-drain of the second pixel switch 5 with the gate line 2, but when forming the gate line layer and the source-drain layer, there often exists alignment error due to the use of different masks, and the overlapping area of the fifth sub-portion 512 with the corresponding gate line 2 and the overlapping area of the third sub-portion 413 and the corresponding gate line 2 are set to be the same in design. The fifth sub-portion 512 and the third sub-portion 413 belong to the same source-drain layer, and even though there is an alignment error between the source-drain layer and the gate line layer, the change amount in their overlapping area with the gate line 2 will be substantially the same, so that the overlapped area of the fifth sub-portion 512 with the corresponding gate line 2 and the overlapped area of the third sub-portion 413 with the corresponding gate line 2 are substantially the same, and the vertical coupling capacitance of the first pixel switch 4 and the vertical coupling capacitance of the second pixel switch 5 are substantially the same.

Figure 18:
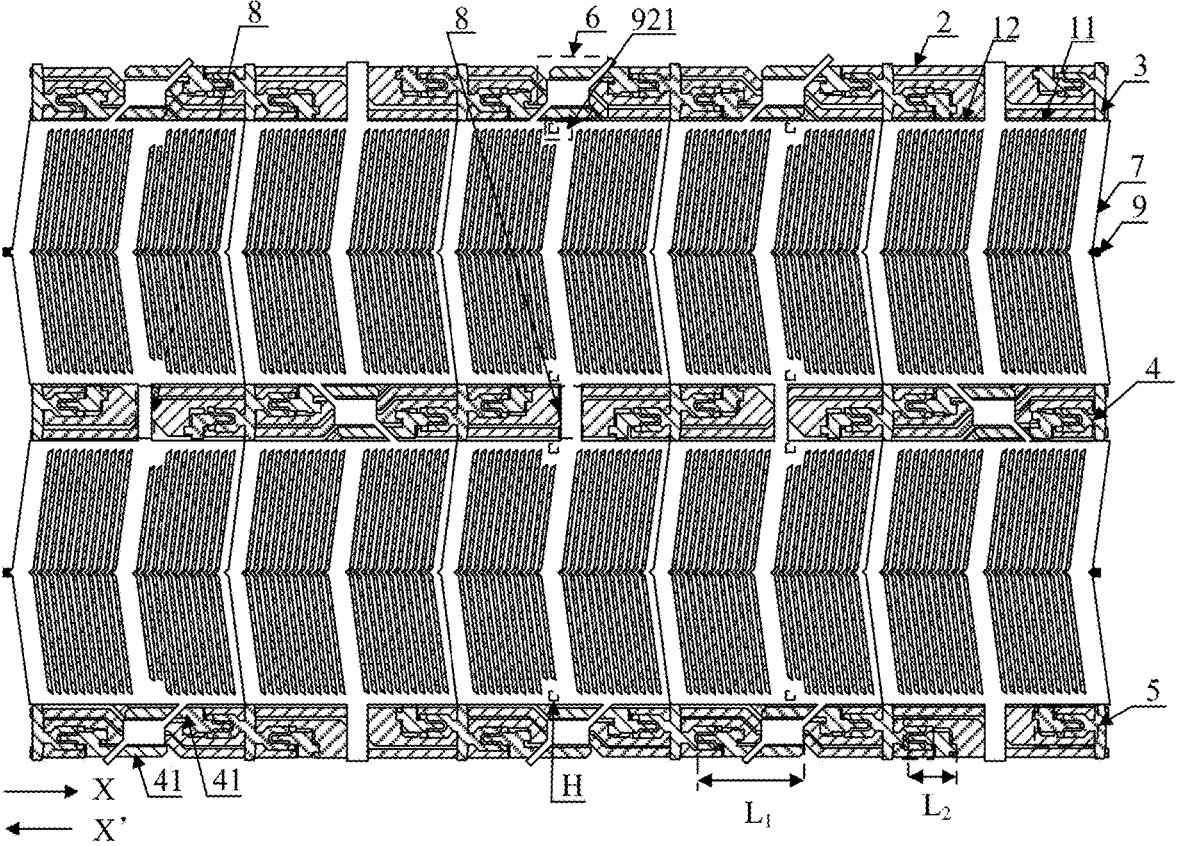
FIG. 18 is a schematic diagram of lengths of a first electrode and a third electrode provided by an embodiment of the present disclosure.

Referring to FIG. 18 for a schematic diagram of lengths of the first electrode and the third electrode provided by the embodiments of the present disclosure.

In the extension direction of the gate line 2, a length of the first electrode 41 is greater than a length of the third electrode 51; and first electrodes 41 of the first pixel switch pair 4D extend in opposite directions.

As shown in a pair of first pixel switches 4 in the lower left corner of FIG. 18, in the extension direction of the data line 3, the first electrode 41 close to the second pixel electrode 12 is extended in the direction X', and the first electrode 41 away from the first pixel electrode 11 is extended in the direction X, and both of them are extended in the opposite directions. Similarly, the extension directions of first electrodes of the remaining pairs of the first pixel switches 4 are also opposite.

As shown in the lower right corner of FIG. 18, the length of the first electrode 41 is $L_1$ and the length of the third electrode 51 is $L_2$, and $L_1 > L_2$.

In the embodiments provided by the present disclosure, the length of the first electrode 41 is greater than the length of the third electrode 51 in the extension direction of the gate line 2, which can make the length of the second electrode 42 of the first pixel switch 4 and the length of the fourth electrode 52 of the second pixel switch 5 substantially the same, so that the difference between the lengths of the first pixel electrodes 11 and the second pixel electrodes 12 electrically connected with the same one data line 3 is reflected in the length of the third electrode 51. At the same time, the extension directions of the first electrodes 41 of each pair of first pixel switches 4 are set to be the same, which facilitates setting the first conductive structure 6 between the first electrodes 41 of each pair of first pixel switches 4 in the extension direction of the data line 3, so as to utilize one first conductive structure 6 to simultaneously shield a portion region of a pair of gate lines 2 between the first electrodes 41 of each pair of first pixel switches 4, and thereby reducing the lateral coupling capacitance of the first pixel switch 4, so that the coupling capacitance of the first pixel switch 4 and the coupling capacitance of the second pixel switch 5 are substantially the same.

Figure 19:
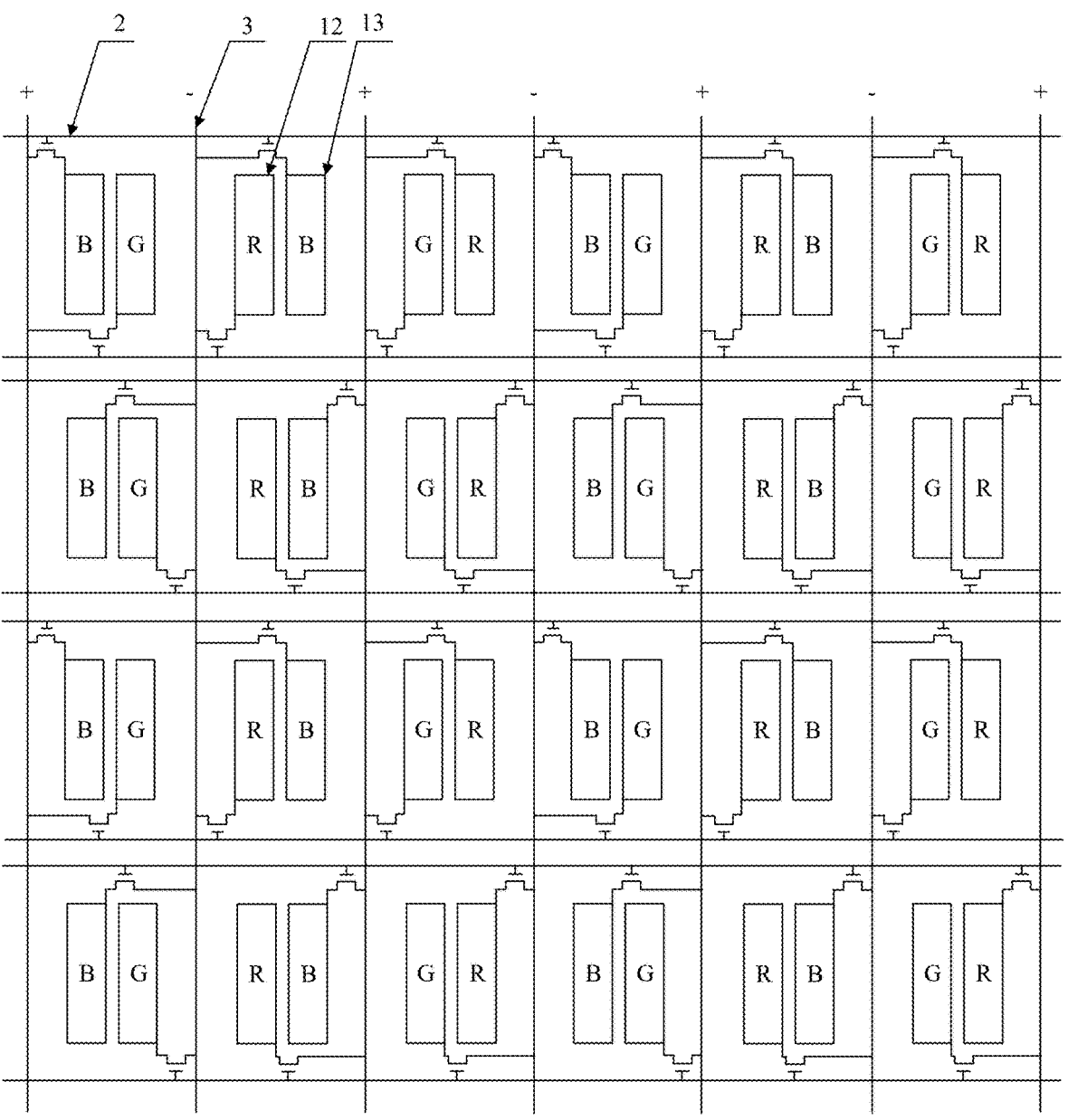
FIG. 19 is a schematic diagram of an array substrate provided by an embodiment of the present disclosure.

Referring to FIG. 19 for a schematic diagram of an array substrate provided by the embodiments of the present disclosure, pixels in the same one column have the same color, and pixel electrodes corresponding to blue and green, respectively, are electrically connected with the same one gate line 2.

As shown in FIG. 19, pixel electrodes (including the first pixel electrode 11 and the second pixel) connected with the odd-numbered gate lines 2 are all blue and green pixel electrodes.

Figure 20:
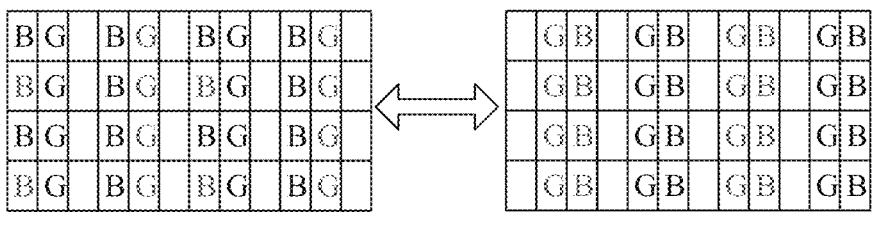
FIG. 20 is a pixel brightness and darkness comparison diagram of GB common gate and RG common gate provided by an embodiment of the present disclosure.

Referring to FIG. 20 for a pixel brightness and darkness comparison diagram when GB common gate and RG common gate provided by the embodiments of the present disclosure. The schematic diagram corresponding to the GB common gate in FIG. 20 is shown in FIG. 19, and the schematic diagram corresponding to the RG common gate is shown in FIG. 1. In the schematic diagrams shown in FIG. 1 and FIG. 19, the data signals are column inverted signals, i.e., all of them are of the same polarity within a frame, and all of them are of the opposite polarity within the next frame with respect to the previous frame. If the gate signal FIG. 1 and FIG. 19 has only one row of output time, the row is charged with all the data in this row, there is no pre-charge. However, in the existing drive mode of a display product, the output time of a single row is greater than the output time of a row, before the arrival of the data in this row, the drive transistor is in an on-state, the data of the previous row will be charged to this row (i.e., pre-charged). If pre-charged signals are of the same polarity, then they play the role of pre-charge, if they are of the opposite polarity or the data corresponding to the previous row is not displayed, then it is considered that there is no pre-charge. When the sky blue image is displayed, the R pixel is not for display, and according to the above rule, the image brightness comparison diagram corresponding to the GB common gate (i.e., in one row of pixels, all the pixels G have the same gate, and all the pixels B have the same gate) in FIG. 19 and the RG common gate (i.e., in one row of pixels, all the pixels R having the same gate, and all the pixels G have the same gate) in FIG. 1 can be determined, as shown in FIG. 20. In FIG. 20, a letter is set to a darker color to indicate that the corresponding pixel is pre-charged, a letter is set to a lighter color to indicate that the corresponding pixel is not pre-charged, and the pixel without a letter indicates that the corresponding pixel (R) is not displayed.

From FIG. 20, it can be seen that when adopting the scheme of GB with the same gate, GB pixels has pre-charged in most cases, and the brightness of GB pixels in columns is more uniform, and the effect of displaying the sky blue image is better; while adopting the scheme of RG with the same gate will result in pixels G in a column and pixels B in another column adjacent to the column of pixels G being the same darkness or lightness, which can cause the display panel to generate obvious vertical stripes when displaying the sky blue image. Therefore, the use of GB common gate can improve the display effect of the sky blue image (i.e., the windows screen).

Figure 21:
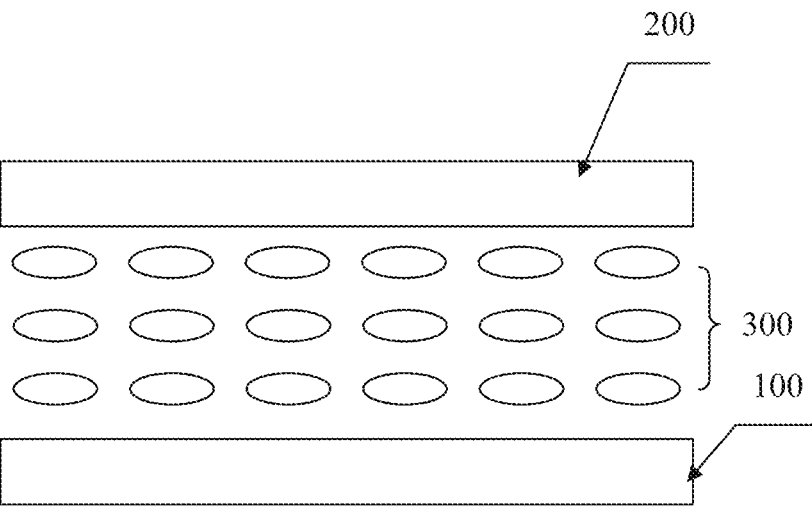
FIG. 21 is a schematic structural diagram of a display panel provided by an embodiment of the present disclosure.

Based on the same inventive concept, the embodiments of the present disclosure provide a display panel, please refer to FIG. 21 for a schematic structural diagram of a display panel provided by the embodiments of the present disclosure, the display panel includes: the array substrate 100 as described above and an opposite substrate 200; the specific structure of the array substrate 100 can be seen in the foregoing description of the array substrate, and will not be limited herein; and a liquid crystal layer 300, disposed between the array substrate 100 and the opposite substrate 200.

The display panel further includes a color film layer, the color film layer includes a plurality of color resists arranged in an array, and the color film layer may be located in the array substrate 100 or in the opposite substrate 200.

The display panel may be present in a display apparatus such as a liquid crystal display, a liquid crystal display, a liquid crystal television, etc., or in a mobile device such as a cell phone, a tablet computer, a notebook, etc.

Based on the same inventive concept, the embodiments of the present disclosure provide a display apparatus including a display panel as described above.

Based on the same inventive concept, the embodiments of the present disclosure provide a preparation method for the array substrate as described above, please refer to FIG. 22 for a flowchart of a preparation method for an array substrate provided by embodiments of the present disclosure, and the structure form of the fabricated array substrate can be refer to the above description of the array substrate, which will not be repeated herein. The preparation method includes following steps.

S10: providing a base substrate.

S11: forming a plurality of gate lines and a plurality of data lines on a side of the base substrate, where the plurality of gate lines and the plurality of data lines define a plurality of pixel pairs distributed in an array, and two gate lines are provided between two adjacent rows of pixel pairs; each the pixel pair includes a first pixel electrode and a second pixel electrode arranged side by side, the first pixel electrode and second pixel electrode are electrically connected with the same one data line, and the first pixel electrode is arranged at a side of the second pixel electrode away from the data line.

S12: forming a first pixel switch and a second pixel switch on the side of the base substrate; where the first pixel switch and the second pixel switch are electrically connected with the first pixel electrode and the second pixel electrode, respectively; in an extension direction of the data line, the first pixel switch and the second pixel switch are distributed in pairs between two different pixel pairs, respectively, and the first pixel switch and the second pixel switch corresponding to the pixel pair are located both sides of the pixel pair; and the first pixel switch includes a first gate, a first electrode and a second electrode, the first gate is electrically connected with a gate line closest to the first pixel switch, the second electrode is electrically connected with a data line, the first electrode is electrically connected with the first pixel electrode, and the first electrode is at least partially overlapped with the second pixel electrode in the extension direction of the data line.

S13: forming a first conductive structure on a side of the plurality of data lines away from the base substrate, where at least part of the first conductive structure is located between two pixel pairs corresponding to each pair of first pixel switches; and in a direction perpendicular to the base substrate, the first conductive structure is at least partially overlapped with the gate lines, and in the extension direction of the data line, the first conductive structure is at least partially overlapped with the first electrode.

Figure 23:
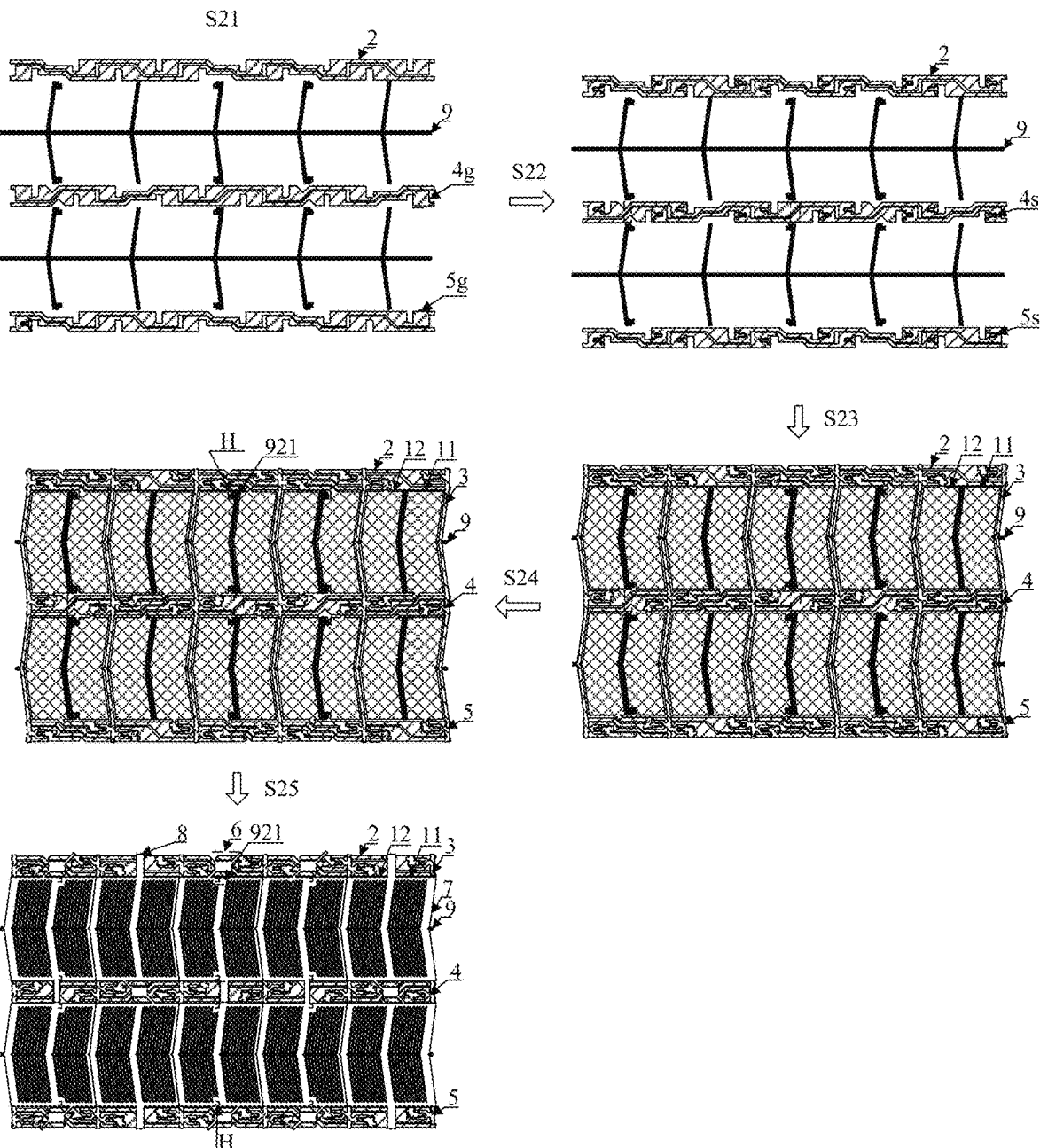
FIG. 23 is a flowchart of a process for fabricating the array substrate in FIG. 18 provided by an embodiment of the present disclosure.

Referring to FIG. 23 for a flowchart provided by the embodiments of the present disclosure for fabricating the array substrate shown in FIG. 18.

S21: forming gate lines 2 and common electrode lines 9, i.e., the gate lines 2 and the common electrode lines 9 are fabricated in the same layer, i.e., the gate line layer and are made of the same material.

The gate lines 2 and the common electrode lines 9 are formed on a side of the base substrate (not shown in FIG. 23), and the structure form of the gate lines 2 and the common electrode lines 9 can be referred to the description of the above array substrate, which will not be repeated here.

A portion region of the gate line 2 is multiplexed as the first gate 4g, and the second gate 5g.

S22: forming active layers 4s/5s.

The active layer 4s of the first pixel switches 4 and the active layer 5s of the second pixel switches 5 are formed at the side of the gate lines 2 away from the base substrate, and optionally, the active layer 5s may be an amorphous silicon, a low-temperature polysilicon, or an oxide semiconductor layer, without limitation herein.

S23: forming the data lines 3, the first pixel electrodes 11, the second pixel electrodes 12 and the source-drain layer.

The data lines 3, the first pixel electrodes 11, the second pixel electrodes 12 and the source-drain layer are formed at the side of the active layers 4s/5s away from the base substrate, and the source-drain layer includes the first electrodes and the second electrodes of the first pixel switches 4, and the third electrodes and the fourth electrodes of the second pixel switches, whereby the first pixel switches 4 and the second pixel switches 5 are formed.

The materials adopted for the above data lines 3, the source-drain electrode layer, the first pixel electrodes 11 and the second pixel electrodes 12 may be the same or different.

When they are made of the same material, the data lines 3, the first pixel electrodes 11, the second pixel electrodes 12 and the source-drain layer may be formed sequentially.

When they are made of different materials, for example the first pixel electrodes and the second pixel electrodes are made of ITO, and the data lines and the source-drain layer are made of other conductive materials, such as a metallic material. The first pixel electrode 11 has conduction with the first electrode by overlapping, and the second pixel electrode 12 has conduction with the third electrode by overlapping, and in the openings of the corresponding pixels, both the first electrode and the second electrode are not overlapped with their respective corresponding openings. The first pixel electrode 11 and the second pixel electrode 12 may protrude connection lines toward the direction of the first electrode and the third electrode to be overlapped with the first electrode and the third electrode. FIG. 24 shows a schematic diagram of the formation of a data line, a source-drain layer, the first pixel electrode and the second pixel electrode provided by the embodiments of the present disclosure.

S24: forming an insulating layer at a side of the first pixel electrodes 11 away from the base substrate, and forming a connection hole(s) H in the insulating layer corresponding to the convex portions 921.

S25: forming a common electrode layer.

The common electrode layer includes common electrodes 7 covering each row of pixels, and first conductive structures 6 and second conductive structures 8 connecting adjacent rows of common electrodes 7. At least part of the first conductive structures 6 is disposed between two pixels corresponding to each pair of first pixel switches 4. In the direction perpendicular to the base substrate, the first conductive structures 6 is at least partially overlapped with the gate lines 2, and in the extension direction of the data line 3, the first conductive structures 6 is at least partially overlapped with the first electrode 41.

Although the preferred embodiments of the present disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the present disclosure.

Obviously, those skilled in the art can make various changes and modifications to the embodiments of the present disclosure without departing from the spirit and scope of the embodiments of the present disclosure. In this way, if these modifications and variations of the embodiments of the present disclosure fall within the scope of the claims of the present disclosure and equivalent technologies, the present disclosure is also intended to include these modifications and variations.

What is claimed is:

1. An array substrate, comprising:
a base substrate;
a plurality of pixel pairs distributed in an array, wherein two gate lines are provided between two adjacent rows of pixel pairs, each of the plurality of pixel pairs comprises a first pixel electrode and a second pixel electrode arranged side by side, the first pixel electrode and the second pixel electrode are electrically connected with the same one data line, and the first pixel electrode is arranged at a side of the second pixel electrode away from the data line;
a first pixel switch and a second pixel switch, electrically connected with the first pixel electrode and the second pixel electrode, respectively; wherein in an extension direction of the data line, the first pixel switch and the second pixel switch are distributed in pairs between two different pixel pairs, respectively, and a first pixel switch and a second pixel switch corresponding to a pixel pair are located at both sides of the pixel pair; and the first pixel switch comprises a first gate, a first electrode and a second electrode, the first gate is electrically connected with a gate line closest to the first pixel switch, the second electrode is electrically connected with a data line, and the first electrode is electrically connected with the first pixel electrode; and
a first conductive structure, wherein at least part of the first conductive structure is located between two pixel pairs corresponding to each pair of first pixel switches; and in a direction perpendicular to the base substrate, the first conductive structure is at least partially overlapped with the gate line, and in the extension direction of the data line, the first conductive structure is at least partially overlapped with the first electrode.

2. The array substrate according to claim 1, further comprising:
a common electrode, at least partially covering pixel pairs in the same row;
wherein first conductive structures in the same one row are configured to electrically connect common electrodes in adjacent rows.

3. The array substrate according to claim 2, wherein the first conductive structure comprises:
a first portion, a second portion, and a third portion connected in sequence; wherein
the first portion is connected between a common electrode corresponding to the second pixel electrode and the second portion, and the third portion is connected between a common electrode corresponding to a second pixel electrode in an adjacent row and the second portion;
in an extension direction of the gate line, a width of the second portion is greater than a width of the first portion and the a width of third portion; and
in the direction perpendicular to the base substrate, the first portion and the third portion are overlapped with the first electrode connected with second pixel electrodes respectively adjacent to the first portion and the third portion, respectively, and the second portion is partially overlapped with two gate lines electrically connected with a corresponding first pixel switch.

4. The array substrate according to claim 3, wherein in the extension direction of the data line, a length of the second portion is greater than or equal to a sum of widths of the two gate lines and a gap between the two gate lines.

5. The array substrate according to claim 2, wherein first conductive structures in the same row have the same extension direction; and
two adjacent rows of the first conductive structures have different extension directions.

6. The array substrate according to claim 2, further comprising:
a second conductive structure, located between two pixel pairs corresponding to a second pixel switch pair, wherein
an extension direction of the second conductive structure is parallel to the extension direction of the data line; and the second conductive structure is configured to electrically connects the common electrodes in adjacent rows; and in the direction perpendicular to the base substrate, the second conductive structure is overlapped with the gate line; and in the extension direction of the gate line, a width of the second conductive structure is less than a width of the first conductive structure;

wherein the common electrode comprises: a plurality of strip electrodes with different extension directions, wherein two ends of the plurality of strip electrodes with different extension directions are connected with each other.

7. The array substrate according to claim 6, wherein in the extension direction of the gate line, a width of a strip electrode that is overlapped with the data line is greater than a width of the data line.

8. The array substrate according to claim 6, further comprising:

a plurality of common electrode lines arranged cross-connectedly and extended along a row direction and a column direction, wherein each of the plurality common electrode lines corresponds to a row of the pixel pairs.

9. The array substrate according to claim 8, wherein the common electrode line comprises:

a straight-line main electrode line, arranged along a region where strip electrodes with different extension directions cross; and a plurality of branch electrode lines; wherein each of the plurality of branch electrode lines is located between the first pixel electrode and the second pixel electrode in each pixel pair, extension directions of the plurality of branch electrode lines are same as the extension directions of the plurality of strip electrodes, and intersection points of the plurality of branch electrode lines with the main electrode line are arranged in a region where the strip electrodes with different extension directions are connected.

10. The array substrate according to claim 9, wherein the plurality of common electrode lines are provided in the same layer as the gate lines; and a branch electrode line is arranged at intervals with gate lines located at both sides of a corresponding pixel pair.

11. The array substrate according to claim 9, wherein a branch electrode line corresponding to a pixel pair having blue pixels further comprises convex portions; and the convex portions are located at two ends of the branch electrode lines, respectively, and are raised toward a region where the blue pixels are located.

12. The array substrate according to claim 11, further comprising:

a first connection hole;

wherein in the direction perpendicular to the base substrate, at least part of the common electrode is electrically connected with a convex portion that is partially overlapped with the first connection hole.

13. The array substrate according to claim 11, wherein widths of second conductive structures corresponding to two branch electrode lines having convex portions with different orientations are different; and a width of a gate line at a position where it is overlapped with a wider one of the second conductive structures is greater than a width of a gate line at a position where it is overlapped with a narrower one of the second conductive structures.

14. The array substrate according to claim 6, wherein the first electrode comprises:

a first sub-portion, a second sub-portion, a third sub-portion, and a first connection sub-portion, wherein, the first sub-portion, the second sub-portion, and the third sub-portion are all connected with the first connection sub-portion;

in the extension direction of the gate line, the second sub-portion and the third sub-portion are located at a side of the first connection sub-portion away from the first sub-portion, and the first sub-portion is overlapped with the first gate, the second sub-portion is not overlapped with a corresponding gate line, and the third sub-portion is overlapped with a corresponding gate line; and the second sub-portion is connected with a corresponding the first pixel electrode, a length of the second sub-portion is greater than a length of the third sub-portion.

15. The array substrate according to claim 14, wherein the second pixel switch comprises:

a third electrode, electrically connected with the second pixel electrode, wherein the second electrode is not overlapped with the second conductive structure;

a fourth electrode, electrically connected with the data line; and a second gate, electrically connected with a gate line closest to the second pixel switch.

16. The array substrate according to claim 15, wherein the third electrode comprises:

a fourth sub-portion, a fifth sub-portion, and a second connection sub-portion connecting the fourth sub-portion to the fifth sub-portion; wherein in the extension direction of the gate line, the fifth sub-portion is located at a side of the second connection sub-portion away from the fourth sub-portion; and the fourth sub-portion is overlapped with the second gate, and the fifth sub-portion is overlapped with a corresponding gate line;

wherein an overlapping area of the fifth sub-portion with the corresponding gate line is substantially the same as an overlapping area of the third sub-portion with the corresponding gate line.

17. The array substrate according to claim 14, wherein in the extension direction of the gate line, a length of the first electrode is greater than a length of the third electrode; and first electrodes of a first pixel switch pair extend in opposite directions.

18. The array substrate according to claim 1, wherein pixels in the same column have the same color; and pixel electrodes corresponding to blue and green, respectively, are electrically connected with the same one gate line; and the data line is provided in the same layer as the first pixel electrode and the second pixel electrode.

19. A display panel, comprising:

the array substrate according to claim 1 and an opposite substrate; and a liquid crystal layer, located between the array substrate and the opposite substrate.

20. A preparation method for the array substrate according to claim 1, comprising:

providing the base substrate;

forming a plurality of gate lines and a plurality of data lines on a side of the base substrate; wherein the plurality of gate lines and the plurality of data lines define a plurality of pixel pairs distributed in an array, the two gate lines are provided between the two adjacent rows of the pixel pairs; each of the plurality of pixel pairs comprises the first pixel electrode and the second pixel electrode arranged side by side, the first pixel electrode and the second pixel electrode are electrically connected with the same one data line, and the first pixel electrode is arranged at the side of the second pixel electrode away from the data line;

forming a first pixel switch and a second pixel switch on the side of the base substrate, wherein the first pixel switch and the second pixel switch are electrically connected with the first pixel electrode and the second pixel electrode, respectively; in the extension direction of the data line, the first pixel switch and the second pixel switch are distributed in pairs between two different pixel pairs, respectively, and a first pixel switch and a second pixel switch corresponding to a pixel pair are located at both sides of the pixel pair; and the first pixel switch comprises a first gate, a first electrode and a second electrode, the first gate is electrically connected with the gate line closest to the first pixel switch, the second electrode is electrically connected with the data line, the first electrode is electrically connected with the first pixel electrode, the first electrode is at least partially overlapped with the second pixel electrode in the extension direction of the data line; and forming the first conductive structure on the side of the plurality of data lines away from the base substrate, wherein at least part of the first conductive structure is located between two pixel pairs corresponding to each pair of first pixel switches; and in the direction perpendicular to the base substrate, the first conductive structure is at least partially overlapped with the gate lines, and in the extension direction of the data line, the first conductive structure is at least partially overlapped with the first electrode.

\* \* \* \* \*